(12) United States Patent
Miller et al.

(10) Patent No.: US 8,612,287 B2
(45) Date of Patent: Dec. 17, 2013

(54) SYSTEM AND METHOD FOR RAIL TRANSPORT OF TRAILERS

(75) Inventors: Douglas J. Miller, Oakville (CA); Alan O. Parry, Mississauga (CA); Philip C. Leung, Scarborough (CA); Ed Venslovaitis, Toronto (CA); Earl Webster, Markham (CA); Dan Lefebvre, Oakville (CA); Hao Tien, Mississauga (CA)

(73) Assignee: Canadian Pacific Railway Company, Calgary (CA)

( * ) Notice: Subject to any disclaimer, the term of this patent is extended or adjusted under 35 U.S.C. 154(b) by 290 days.

(21) Appl. No.: 12/822,134

(22) Filed: Jun. 23, 2010
(Under 37 CFR 1.47)

(65) Prior Publication Data
US 2011/0153470 A1    Jun. 23, 2011

Related U.S. Application Data

(63) Continuation of application No. 09/579,918, filed on May 26, 2000, now abandoned.

(60) Provisional application No. 60/136,544, filed on May 28, 1999.

(51) Int. Cl.
*G06Q 99/00* (2006.01)

(52) U.S. Cl.
USPC ............... 705/13; 705/28; 705/30; 705/7.11; 705/1.1

(58) Field of Classification Search
USPC ................................................. 705/13, 28, 30
See application file for complete search history.

(56) References Cited

U.S. PATENT DOCUMENTS

| | | | |
|---|---|---|---|
| 3,215,090 A | 11/1965 | Gibbs, Sr. | |
| 3,889,603 A | 6/1975 | Harada | |
| 4,190,393 A | 2/1980 | Landow | |
| 4,238,241 A | 12/1980 | Schneider | |
| 4,385,857 A * | 5/1983 | Willetts | ............ 410/53 |
| 4,750,197 A | 6/1988 | Denekamp et al. | |

(Continued)

FOREIGN PATENT DOCUMENTS

| | | |
|---|---|---|
| CA | 2174189 | 10/1996 |
| DE | 4446684 | 6/1996 |

(Continued)

OTHER PUBLICATIONS

"U.S. Appl. No. 09/579,557, Amendment Under 37 CFR 1.312 filed May 10, 2002", 2 pgs.

(Continued)

*Primary Examiner* — Akiba Allen
(74) *Attorney, Agent, or Firm* — Schwegman Lundberg & Woessner, P.A.

(57) ABSTRACT

A trailer transport system for tracking trains having a plurality of rail cars, wherein each rail car can transport a trailer, is described. The system includes a computer system having a trailer tracking program, wherein the trailer tracking program receives information regarding a trailer to be transported and stores the information in a record and a plurality of terminals, wherein each terminal includes a terminal management system communicatively connected to the computer system, wherein the terminal management system pulls up the record corresponding to the trailer to be transported when the trailer arrives at the terminal and modifies the record to reflect the trailer's transportation status.

30 Claims, 18 Drawing Sheets

(56) References Cited

U.S. PATENT DOCUMENTS

| | | | |
|---|---|---|---|
| 4,765,772 A | 8/1988 | Benedetti et al. | |
| 4,831,539 A | 5/1989 | Hagenbuch | |
| 4,858,383 A | 8/1989 | Kendig | |
| 4,897,642 A | 1/1990 | DiLullo et al. | |
| 4,973,206 A | 11/1990 | Engle | |
| 5,067,872 A | 11/1991 | Engle | |
| 5,246,081 A | 9/1993 | Engle | |
| 5,390,880 A * | 2/1995 | Fukawa et al. | 246/167 R |
| 5,475,597 A | 12/1995 | Buck | |
| 5,485,369 A | 1/1996 | Nicholls et al. | |
| 5,489,898 A | 2/1996 | Shigekusa et al. | |
| 5,511,899 A | 4/1996 | Pavelek, II | |
| 5,539,810 A | 7/1996 | Kennedy, III et al. | |
| 5,635,693 A | 6/1997 | Benson et al. | |
| 5,705,991 A | 1/1998 | Kniffin et al. | |
| 5,712,789 A | 1/1998 | Radican | |
| 5,719,771 A | 2/1998 | Buck et al. | |
| 5,751,973 A | 5/1998 | Hassett | |
| 5,781,892 A | 7/1998 | Hunt et al. | |
| 5,917,433 A * | 6/1999 | Keillor et al. | 340/989 |
| 5,999,091 A | 12/1999 | Wortham | |
| 6,006,148 A | 12/1999 | Strong | |
| 6,026,378 A | 2/2000 | Onozaki | |
| 6,055,426 A | 4/2000 | Beasley | |
| 6,092,338 A | 7/2000 | Crowner et al. | |
| 6,111,524 A | 8/2000 | Lesesky et al. | |
| 6,142,372 A | 11/2000 | Wright | |
| 6,148,202 A | 11/2000 | Wortham | |
| 6,186,700 B1 | 2/2001 | Omann | |
| 6,194,851 B1 | 2/2001 | Denault et al. | |
| 6,254,201 B1 | 7/2001 | Lesesky et al. | |
| 6,295,449 B1 | 9/2001 | Westerlage et al. | |
| 6,313,791 B1 * | 11/2001 | Klanke | 342/357.75 |
| 6,341,271 B1 | 1/2002 | Salvo et al. | |
| 6,356,802 B1 | 3/2002 | Takehara et al. | |
| 6,427,152 B1 | 7/2002 | Mummert et al. | |
| 6,463,420 B1 | 10/2002 | Guidice et al. | |
| 6,490,523 B2 | 12/2002 | Doner | |
| 6,492,912 B1 | 12/2002 | Jones | |
| 6,571,149 B1 | 5/2003 | Hahn-Carlson | |
| 6,665,585 B2 | 12/2003 | Kawase | |
| 6,697,735 B2 | 2/2004 | Doyle | |
| 6,704,626 B1 | 3/2004 | Herzog et al. | |
| 6,739,507 B2 | 5/2004 | Kudyba | |
| 6,744,403 B2 | 6/2004 | Milnes et al. | |
| 6,748,320 B2 | 6/2004 | Jones | |
| 6,753,775 B2 | 6/2004 | Auerbach et al. | |
| 6,927,688 B2 | 8/2005 | Tice | |
| 6,934,540 B2 | 8/2005 | Twitchell, Jr. | |
| 6,965,827 B1 | 11/2005 | Wolfson | |
| 6,972,682 B2 | 12/2005 | Lareau et al. | |
| 6,978,195 B2 | 12/2005 | Kane et al. | |
| 6,980,131 B1 | 12/2005 | Taylor | |
| 6,987,441 B2 | 1/2006 | Roeland | |
| 2001/0041948 A1 | 11/2001 | Ross et al. | |

FOREIGN PATENT DOCUMENTS

| | | |
|---|---|---|
| EP | 0523820 | 1/1993 |
| EP | 0742168 | 4/1996 |
| GB | 2304953 | 3/1997 |
| JP | 11-175894 A | 7/1999 |
| WO | WO-96/13015 A1 | 5/1996 |
| WO | WO-98/18250 A2 | 4/1998 |
| WO | WO 9839192 A1 * | 9/1998 |
| WO | WO-99/06161 A1 | 2/1999 |

OTHER PUBLICATIONS

"U.S. Appl. No. 09/579,557, Non final office action mailed Jul. 6, 2001", 12 pgs.

"U.S. Appl. No. 09/579,557, Notice of allowance mailed Mar. 12, 2002", 7 pgs.

"U.S. Appl. No. 09/579,557, Response filed Jan. 7, 2002 to Non Final Office Action mailed Jul. 6, 2001", 15 pgs.

"U.S. Appl. No. 09/579,918, Appeal Brief mailed Mar. 8, 2005", 29 pgs.

"U.S. Appl. No. 09/579,918, Final Office Action mailed Dec. 4, 2008", 2 pgs.

"U.S. Appl. No. 09/579,918, Final Office Action mailed Mar. 26, 2007", 18 pgs.

"U.S. Appl. No. 09/579,918, Final Office Action mailed May 5, 2005", 16 pgs.

"U.S. Appl. No. 09/579,918, Non Final Office Action mailed May 25, 2006", 9 pgs.

"U.S. Appl. No. 09/579,918, Non Final Office Action mailed Sep. 10, 2003", 14 pgs.

"U.S. Appl. No. 09/579,918, Non-Final Office Action mailed Mar. 17, 2008", 16 pgs.

"U.S. Appl. No. 09/579,918, Notice of Allowance mailed Mar. 23, 2010", 11 pgs.

"U.S. Appl. No. 09/579,918, Response filed Nov. 27, 2006 to Non Final Office Action mailed May 25, 2006", 16 pgs.

"U.S. Appl. No. 09/579,918, Response filed Nov. 3, 2004 Final Office Action mailed May 5, 2004".

"U.S. Appl. No. 09/579,918, Response filed Feb. 10, 2004 to Non Final Office Action mailed Sep. 10, 2003", 16 pgs.

"U.S. Appl. No. 09/579,918, Response filed Aug. 18, 2008 to Non-Final Office Action mailed Mar. 17, 2008", 13 pgs.

"U.S. Appl. No. 09/579,918, Restriction Requirement mailed May 20, 2003", 7 pgs.

"Canadian Application Serial No. 2,373,425 Response filed Sep. 7, 2010", 9 pgs.

"Canadian Application Serial No. 2,373,425, Office Action mailed Aug. 18, 2011", 2 pgs.

"Canadian Application Serial No. 2,373,425, Response filed Feb. 17, 2012 to Office Action mailed Aug. 18, 2011", 14 pgs.

"Canadian Application Serial No. 2,373,425, Amendment/Remarks Following Examiner's Report filed Dec. 14, 2006", 36 pgs.

"Canadian Application Serial No. 2,373,425, Examiner's Report mailed Jun. 14, 2006", 5 pgs.

"Canadian Application Serial No. 2,375,321, Amendment/Remarks After Examination Report filed Aug. 20, 2007", 20 pgs.

"Canadian Application Serial No. 2,375,321, Office Action mailed Feb. 20, 2007", 2 pgs.

"International Application Serial No. PCT/US00/14533, International Preliminary Examination Report mailed Feb. 26, 2001", 6 pgs.

"International Application Serial No. PCT/US00/14533, International Search Report mailed Oct. 6, 2000", 4 pgs.

"International Application Serial No. PCT/US00/14545, Amendment Before the International Preliminary Examination Authority filed May 16, 2001", 12 pgs.

"International Application Serial No. PCT/US00/14545, International Search Report mailed Oct. 6, 2000", 3 pgs.

"International Application Serial No. PCT/US00/14545, Written Opinion mailed Oct. 6, 2000", 5 pgs.

"User's Guide: Borland Paradox for Windows, Version 5.0", Borland International, Inc., (1994), 189 pgs.

Gralla, P., *How the Internet Works, Millennium Ed.*, Que Corporation, (Aug. 1999), 27 pgs.

White, R., *How Computers Work, Millennium Ed.*, Indianapolis, IN : Que Corporation, (Sep. 1999), 12-13.

* cited by examiner

| PROCESS | HAND-HELD | WORKSTATION | BBS SERVER | APPLICATION SERVER | MAINFRAME |
|---|---|---|---|---|---|
| RESERVATIONS MANAGEMENT | | | | | |
|    CREATE RESERVATION | | | X | X | |
|    MODIFY RESERVATION | | | X | X | |
|    CANCEL RESERVATION | | | X | X | |
|    CONFIRM RESERVATION | | | X | X | |
|    VIEW RESERVATION STATUS | | | X | X | |
|    CREATE CUSTOMER PROFILE | | | X | X | |
|    MODIFY CUSTOMER PROFILE | | | X | X | |
|    INQUIRE CUSTOMER PROFILE | | | X | X | |
| TERMINAL MANAGEMENT | | | | | |
|    CHECK-IN TRAILER | | X | | X | |
|    CHECK-OUT TRAILER | | X | | X | |
|    LOAD TRAILER | | X | | X | |
|    UNLOAD TRAILER | | X | | X | |
| TRAIN MANAGEMENT | | | | | |
|    DEPART TRAIN | | | X | X | X |
|    ARRIVE TRAIN | | | X | X | X |

*FIG. 9*

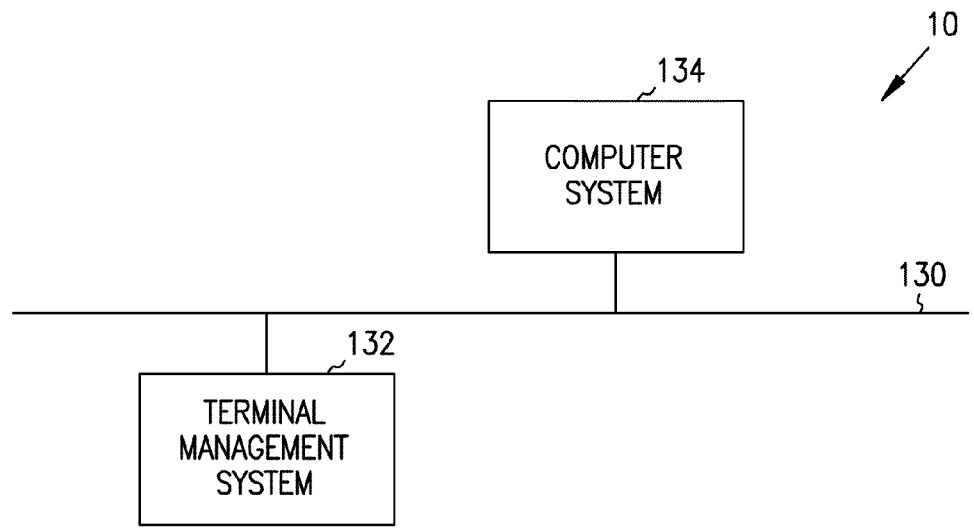

CONFIRMATION DETAILS - CUSTOMER INFORMATION

FIG. 18

SYSTEM AND METHOD FOR RAIL TRANSPORT OF TRAILERS

CROSS REFERENCE TO RELATED CASES

This application is a continuation application of U.S. patent application Ser. No. 09/579,918, filed on May 26, 2000, entitled "System and Method for Rail Transport of Trailers,", which claims the priority of U.S. Provisional Patent Application Ser. No. 60/136,544, filed May 28, 1999, entitled "System and Method for Rail Transport of Trailers," which relates to commonly assigned U.S. Pat. No. 6,439,128, issued on Aug. 27, 2002, entitled "Terminal Design," and which applications are incorporated herein by reference.

TECHNICAL FIELD

The present invention is related to intermodal transportation, and more particularly to a system and method of controlling the transport of trailers over a railway system.

BACKGROUND INFORMATION

The transport of truck trailers by train has traditionally been limited to long haul transport. Trailer design, railroad car design and scheduling problems have made it difficult for trains to compete in short and medium haul corridors. To date, trailers have had to be reinforced to handle the stress of rail transport. In addition, trucking companies have been forced to accept fairly wide windows of time for delivery.

Currently, trucking customers arrive at the train terminal and wait in line for a clerk to manually input the details of the shipment at the gate, to include billing information, contents of the truck, owner, driver, destination, weight, commodity code, commodity description, package type, broker and other pertinent information needed to transport the trailer and provide billing information. This process is time consuming and tedious; tractor-trailer drivers may wait in line at the gate for over an hour as each truck ahead of his goes through the check-in process. In addition, the time required to check-in a trailer is lengthy.

Furthermore, transport of trailers via rail has been unpredictable. When the trucking customer arrives with a trailer to transport, they do not know if their trailer will be transported on the next train. The customer's container may be left behind for subsequent trains. In addition, it can be difficult to determine the train the trailer will be on and when that train will arrive at its destination. As a result trailer transportation via rail is an unreliable, frustrating and complex system.

Trucks are a very efficient transportation medium, especially in short and medium haul corridors. Over the last 10 to 15 years, there have been a variety of attempts by the railway industry to move truck trailers onto rails. As noted above, most of these attempts to create intermodal transportation systems, however, require expensive modifications to the trailer to make it sturdy enough to withstand forces applied by cranes and by transport on the rails. Also the cost of building and outfitting railway terminals for truck transport is very expensive. A complex railway system for loading and loading trains is needed. In addition, trucking companies chafe at the long delays and complex processes of the railway companies.

What is needed is a simple and reliable transport system which ensures that a train leaves on schedule and arrives at its destination within a predetermined, narrow window of time.

In addition, what is needed is a low cost high quality profitable intermodal system that reduces current bottlenecks and provides an efficient means of transporting trailers via rail.

Finally, what is needed is a system and method for efficiently and economically transporting trailers via train across high density corridors.

SUMMARY

The above mentioned problems with intermodal transportation are addressed by the present invention and will be understood by reading and studying the following specification.

According to one aspect of the present invention, a trailer transport system for tracking trains having a plurality of rail cars, wherein each rail car can transport a trailer, is described. The system includes a computer system having a trailer tracking program, wherein the trailer tracking program receives information regarding a trailer to be transported and stores the information in a record and a plurality of terminals, wherein each terminal includes a terminal management system communicatively connected to the computer system, wherein the terminal management system pulls up the record corresponding to the trailer to be transported when the trailer arrives at the terminal and modifies the record to reflect the trailer's transportation status.

According to another aspect of the present invention, in a trailer transport system having a computer system and a plurality of terminals, including a first and a second terminal, wherein each terminal includes a terminal management system communicatively coupled to the computer system, a system and method of tracking a trailer to be transported between the first and second terminals. Information is entered identifying the trailer. The information is stored as a record within the computer system. The record is modified at trailer check-in, wherein modifying the record includes accessing the record through the terminal management system of the first terminal. The modified record is stored. The trailer is transported from the first terminal to the second terminal and the modified record is updated through the terminal management system of the second terminal, wherein updating includes storing information indicating the trailer has arrived at the second terminal. The updated record is then stored.

According to yet another aspect of the present invention, in a trailer transport system having a computer system and a plurality of terminals, including a first and a second terminal, a system for tracking movement of a trailer is described. The system includes a network, a computer system communicatively coupled to the network, a first terminal management system associated with the first terminal and a second terminal management system associated with the second terminal. The computer system includes a data storage system used to store information identifying the trailer. The first terminal management system is communicatively coupled to the network and communicates through the network to the computer system. The second terminal management system is communicatively coupled to the network and communicates through the network to the computer system. Each terminal management system tracks arrivals and departures of trailers from the terminal and modifies the information stored in the data storage system as a function of said arrivals and departures.

According to yet another aspect of the present invention, in a trailer transport system having a computer system and a plurality of terminals, including a first and a second terminal, a system for tracking movement of a trailer is described. The system includes a network, a computer system communicatively coupled to the network, a first access restriction system associated with the first terminal and a second access restriction system associated with the second terminal. The computer system includes a data storage system used to store information identifying the trailer. The first access restriction system is communicatively coupled to the network and communicates through the network to the computer system. The second access restriction system is communicatively coupled to the network and communicates through the network to the computer system. Each access restriction system tracks arrivals and departures of trailers from the terminal and modifies the information stored in the data storage system as a function of said arrivals and departures.

According to yet another aspect of the present invention, a system and method of tracking transport of a trailer includes recording, in a computer system, arrival of the trailer at a first terminal, checking condition of the trailer, recording the condition of the trailer in the computer system, loading the trailer on a train, wherein loading includes performing an air brake inspection, recording, in the computing system, departure of the train from the first terminal, recording, in the computing system, arrival of the train at a second terminal, unloading the trailer from the train, matching a driver to the trailer through records stored in the computer system, recording, in the computing system, departure of the trailer from the second terminal and storing data corresponding to trailer transport within an accounting system.

According to yet another aspect of the present invention, a system and method of controlling access to a parking area for trailers includes transporting a trailer into the parking area, wherein transporting includes dispensing a ticket from a ticket dispenser and opening a gate, inspecting the trailer, wherein inspecting includes scanning the ticket with a scanner, and issuing an exit code. The exit code is used to exit the parking area.

BRIEF DESCRIPTION OF THE DRAWINGS

FIG. 9 is a representation of business process mapping on applications.

FIG. 10 is a block diagram of one embodiment of a trailer transport system according to the teachings of the present invention.

Figure 14:
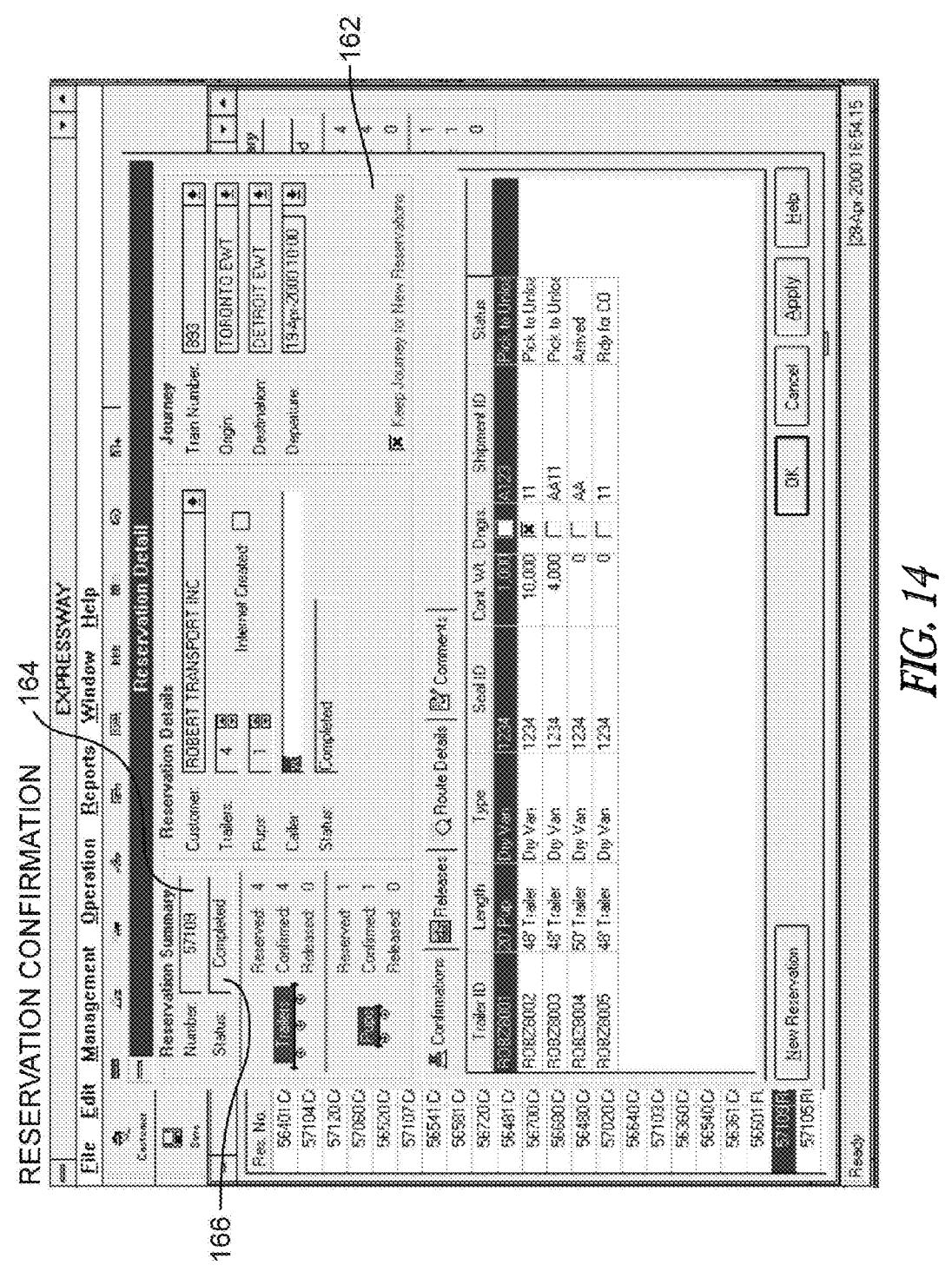

FIGS. 11-18 are depictions of a user interface for making reservations.

DETAILED DESCRIPTION

In the following detailed description of the preferred embodiments, reference is made to the accompanying drawings that form a part hereof, and in which is shown by way of illustration specific embodiments in which the invention may be practiced. It is to be understood that other embodiments may be utilized and structural changes may be made without departing from the scope of the present invention.

Some portions of the detailed descriptions, which follow, are presented in terms of algorithms and symbolic representations of operations of data bits within a computer memory. These algorithmic descriptions and representations are the means used by those skilled in the data processing arts to most effectively convey the substance of their work to other skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and other wise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussion utilizing terms such as "processing" or "computing" or "calculating" or "determining" or "displaying" or the like, refer to the action and processes of a computer system or similar computing device, that manipulates and transforms data represented as physical (e.g., electronic) quantities within the computer system's registers and memories into other data similarly represented as physical quantities within the computer system memories or registers or other such information storage, transmission or display devices.

As noted above, there is a need for a low cost, high-quality, profitable intermodal product for the short-haul, truck competitive market which allows railway companies to partner effectively with the trucking industry. Truckers want a simplified business process for their intermodal shipments. They also desire fast terminal throughput.

It is possible to leverage information technology to simplify the intermodal business process. This is desirable not only to eliminate the familiar line-ups at the terminal entry gate, but also to guarantee the delivery of a customer's shipment on a designated train, at a specified time.

Figure 1:
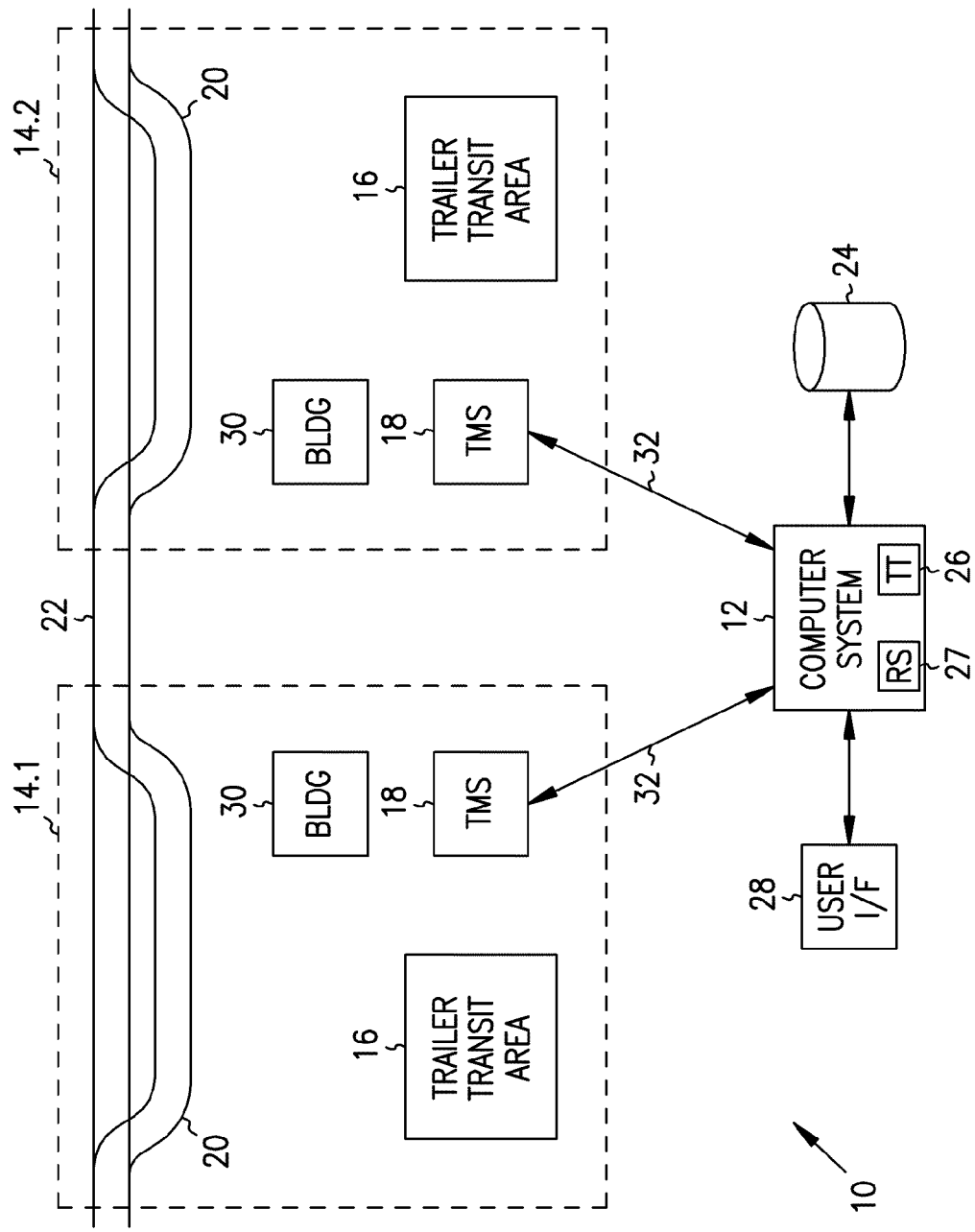
FIG. 1 is a block diagram of one embodiment of a trailer transport system according to the teachings of the present invention.

A trailer transport rail system 10 is shown in FIG. 1. The system shown in FIG. 1 includes a computer system 12, terminals 14.1 and 14.2 and a main rail 22. Each terminal 14 includes a trailer transit area 16, a terminal management system 18 and a loading track 20 connected to main rail 22. Computer system 12 includes a data storage system 24 and a trailer tracking program 26, wherein trailer tracking program 26 receives information regarding a trailer to be transported and stores the information in a record. The terminal management system 18 for each terminal 14 tracks arrivals and departures of trailers from the terminal and modifies the information stored in data storage system 24 as a function of said arrivals and departures.

In one embodiment, one or more guaranteed slots can be reserved on each intermodal train. (In contrast, conventional intermodal procedures can often result in the customer's container being left behind for the next train.) In one such embodiment, customers use the Internet, phone or fax to reserve a slot on the train using an automated reservation system. In one embodiment, automated reservation system 27 runs on computer system 12 and is accessed through user interface 28.

In one such embodiment, the data confirmed by the customer on the automated reservation system drives the rest of the transport process. When a driver arrives at terminal 14, there is no waiting for a clerk to input the details of the shipment at the gate. The data already has been captured on the system prior to the driver's arrival at the facility.

In one embodiment, hand-held portable computers are used to control all terminal operations. The paperless environment created by the hand-held units and the automated reservation system reduces the driver's time in the yard to a fraction of the time spent at a conventional terminal.

In contrast to conventional intermodal terminals, where it is often the case that a trailer is dropped off without any guarantee that it will make it on the next train, the reservation system of the current approach guarantees customers a slot on the train. The system's scheduled service assures customers that their freight will arrive consistently on time, regardless or weather or road conditions. This is a major factor in competing with truck only approaches.

The Internet functionality discussed above also facilitates business processes with customers, while increasing productivity.

Fast terminal throughput times can be attributed to the simple terminal design and business process, which, in one embodiment, are enabled by the hand-held computers used to control everything from trailer check-in, safety inspections of each load, to the departure of the loaded train.

In one embodiment, each terminal 14 includes at least one set of loading tracks 20, an office building 30 and a spacious yard 16 for easy maneuvering. In one such embodiment, terminal 14 is designed so as to eliminate the entry gate. The entry gate function is performed instead by terminal management system 18 and reservation system 27. For instance, in one embodiment, instead of lining up and completing paperwork with a clerk at the gate, the driver simply takes an automated ticket and moves into terminal 14. By the time the trailer has been dropped off or picked up, the terminal operator has already referenced the shipment data from automated reservation system 27 and completed the "electronic paperwork" on terminal management system 18.

Figure 2:
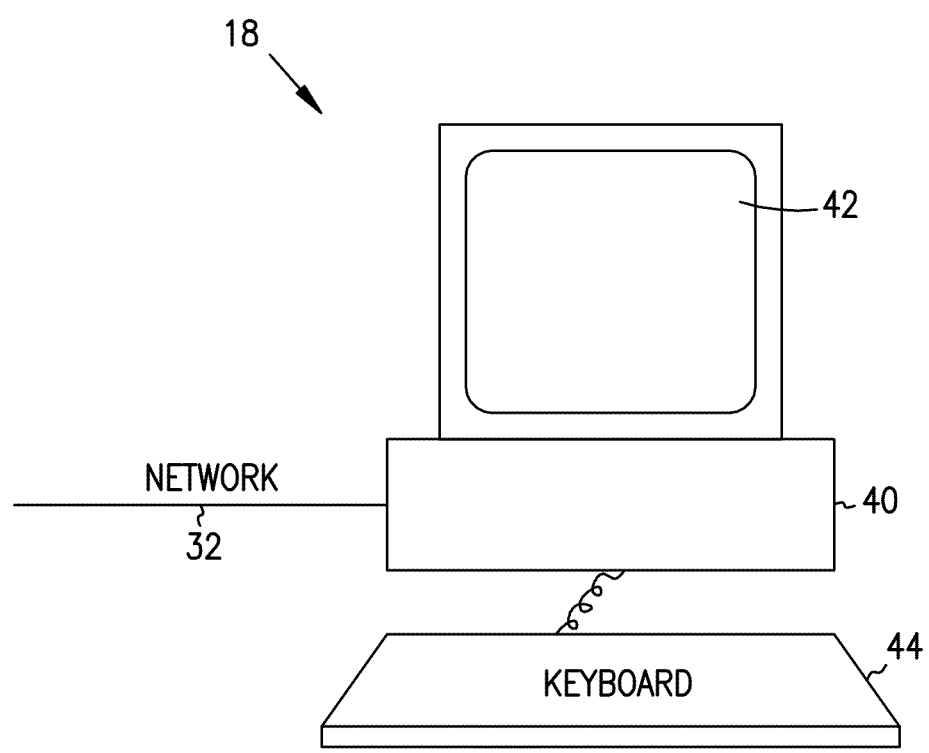
FIGS. 2-4 are block diagrams of embodiments of a terminal management system according to the present invention.

In one embodiment, terminal management system 18 includes a computer 40 which communicates with computer system 12 over network 32. Such an embodiment is shown in FIG. 2. In the embodiment shown in FIG. 2, computer 40 includes a user interface such as computer screen 42 or keyboard 44. In one such embodiment, computer 40 includes a touch screen where data can be entered via a stylus.

Figure 3:
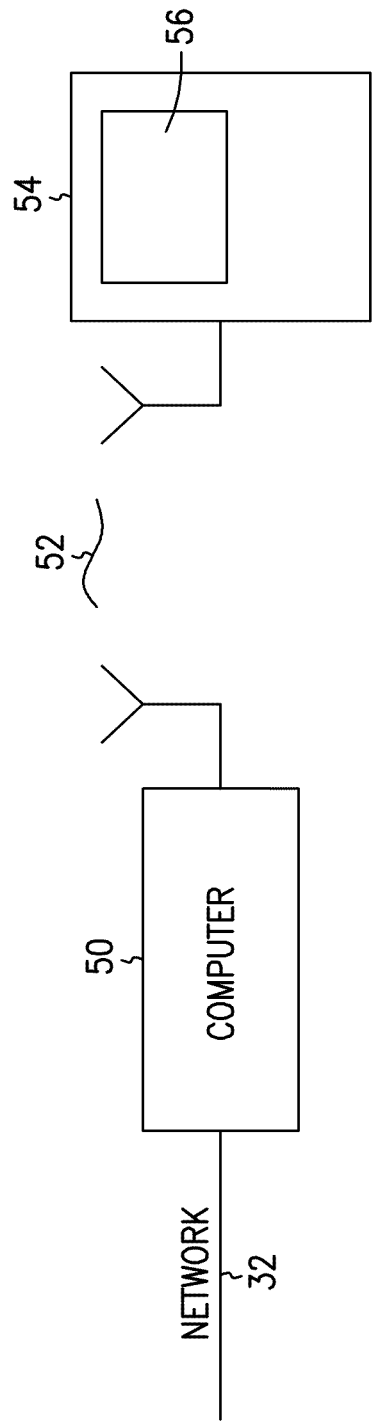

In another embodiment, such as is shown in FIG. 3, terminal management system 18 includes a computer 50 which communicates with computer system 12 over network 32. In turn, computer 50 communicates with a handheld computer 54 via a wireless communications medium 52. In one such embodiment, handheld computer 54 includes a touch screen where data can be entered via a stylus. The driver can, therefore, sign the computer screen, receive and exit code and then punches in the exit code on the way out of terminal 14.

In one embodiment, handheld computer 54 employs both a wireless network and client-server technology to communicate with computer system 12. This combination offers advantages in moving trailers on and off the trains, in checking in the trailers and in preparing for them to be taken by a truck driver.

In one embodiment, each terminal 14 is a long, thin design having multiple loading areas. In a train system using multiple sets of spine cars, one or more sets of spine cars can be separated and loaded using portable loading ramps and hostler trucks operating in parallel. Such an approach is discussed in application Ser. No. 09/579,557, entitled "TERMINAL DESIGN" and filed herewith. That discussion is incorporated herein by reference.

Separate from the information technology, in one embodiment the train itself has many unique features. It is not a train in the conventional sense, but a flexible railway element which bends around curves, therefore it doesn't have the between-car coupler action rail personnel call "slack". This unique ability to eliminate slack improves the ride and reduces the chances of damaging high-value freight. In addition, by reducing the forces exerted on the trailers, this approach permits the use of rail to transport conventional trailers without modification.

In one embodiment, each train includes twelve sets of five spine cars.

In one embodiment, each train includes a split ramp car which provides two drive-on/drive-off surfaces. Standard highway trailers can be driven on and off the platforms. This compares favorably to conventional intermodal terminal technology where reinforced trailers are hoisted on and off the train using expensive and sophisticated cranes. In another embodiment, portable ramps are attached to each set of spine cars in order to facilitate loading and unloading using a hostler truck.

Automated reservation system 27 ensures that all data relating to a customer's shipment is already captured prior to their arrival at terminal 14. This data, in turn, drives the rest of the business and operations processes of system 10.

In one embodiment, hand-held computer units 54 operate to register a truck's arrival at the terminal, assign the truck a parking area or a parking space, document loading and unloading of the train, record the results of the air brake inspection and record departure & arrival times. That data is used in turn to drive the accounting systems and to produce management reports.

The elimination of the entry gate bottleneck is a major change from the approach taken in traditional intermodal terminals (where truckers line up to complete paperwork with a clerk). As noted above, at times a fairly large number of trucks can queue up at the entry gate waiting to be checked in. The trucker must complete the paperwork at the intermodal terminal entry gate before the trucker proceeding into the terminal. The driver should then be able to expect to spend less than 30 minutes delivering his/her trailer.

This is in stark contrast to the present terminal design, where a driver does not wait at a terminal gate but instead simply presses the button on a ticket dispenser to enter. The driver proceeds to parking area 16 and is met by a terminal operator who uses a hand-held computer 54 to scan the entry ticket and to check-in the trailer. Since automated reservation system 27 already knows the details of the shipment, the driver does not have to provide any additional information. The driver simply signs screen 56 of hand-held unit 54 as a receipt for the trailer, receives an exit code and departs terminal 14 by inputting an exit code at the departure gate.

In one embodiment, system 10 employs a client-server architecture to provide the greatest potential for delivering business value and to support the fast-paced business operations. In one such embodiment, system 10 includes five main client-server components including: application server, mainframe systems, client workstations, Web server, mainframe systems, client communicate using a wireless network. Internet access to automated reservation system 27 is provided for those customers seeking to automate their own business processes.

Figure 4:
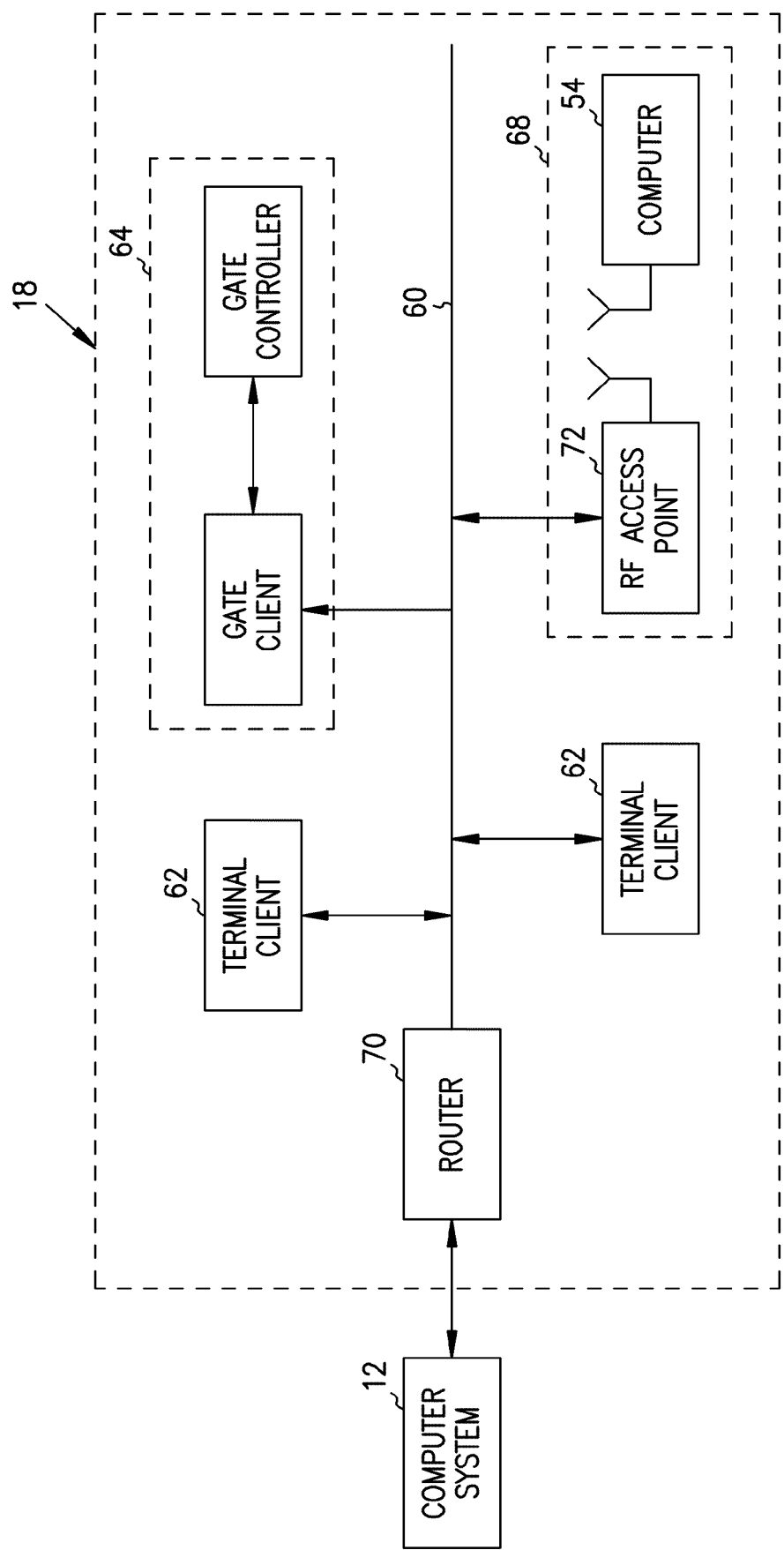

In one embodiment, intermodal transportation system 10 includes two or more specially designed terminal management systems 18. One such terminal management system 18 is shown in FIG. 4. In the example shown in FIG. 4, each terminal management system 18 includes a local area network (LAN) 60 (e.g., a Token Ring network) that connects client workstations 62, a gate system 64, an RF network 68 and a router 70.

In one embodiment, gate system 64 controls and manages security for the entry and exit gates. In one embodiment, gate system 64 controls a ticket dispenser which dispenses a ticket to a driver and then opens the entry gate. Gate system 64 also is connected to an exit keypad. The keypad receives an exit code entered by the driver and forwards the code to system 64. If the code is valid, system 64 opens the exit gate.

In one embodiment, RF network 68 consists of external access points 72 mounted throughout the yard 16. Access points 72 provide RF coverage throughout terminal 14 for communications with hand-held units 54. In one embodiment, access points 72 are connected by fiber optic cables to an Ethernet FiberLink hub. In one such embodiment, the hub is connected to router 70, which in turn is connected to computer system 12.

A client-server architecture typically differs from traditional mainframe-based systems in the following ways:
1) PC applications with graphical user interfaces vs. terminals or terminal emulators with character-based interfaces;
2) Servers vs. mainframe for file, print, application, and other services;
3) relational database systems vs. hierarchical database systems;
4) LAN, WAN, and dial-up inter-networking vs. SNA 3270-based communications;
5) open standards-based technology vs. proprietary technology.

Client-server technology provides the greatest potential for delivering business value. It is the area which has greatest product support in the market, the area where hardware and software innovations are being made, and the technology which can deliver the responsiveness required by a changing business environment.

Figure 5:
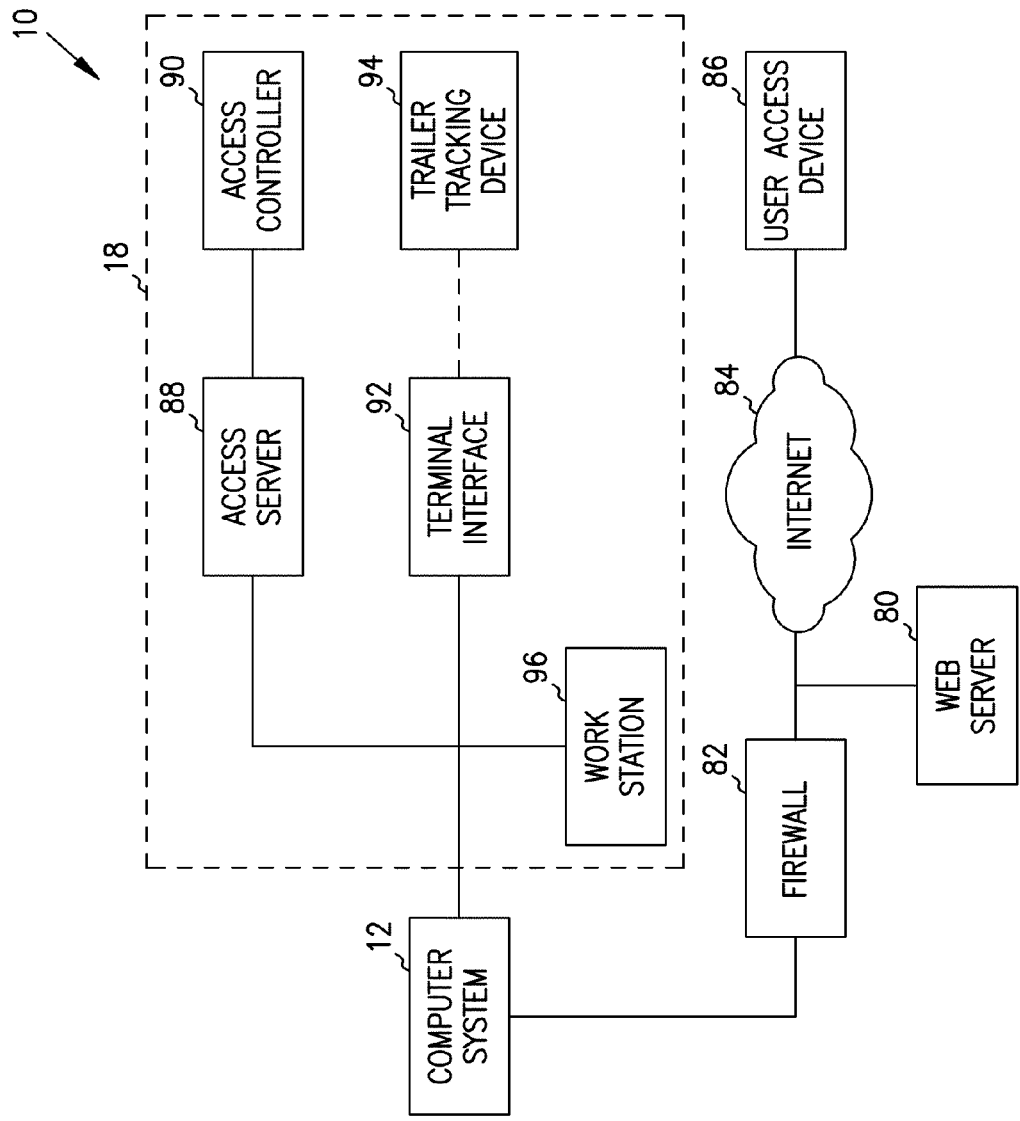
FIGS. 5-8 are block diagrams of embodiment of a trailer transport system according to the teachings of the present invention.

Another embodiment of system 10 is shown in FIG. 5. In FIG. 5, system 10 includes a computer system 12, a web server 80, a firewall 82 and a terminal management system 18. In the embodiment shown, customers access web server 80 using a device 86 connected to a WAN 84 such as the Internet. In one such embodiment (such as is shown in FIG. 6) web server 80 is placed in a DMZ to limit exposure to hackers.

In the embodiment shown in FIG. 5, terminal management system 18 includes an access server 88 connected to an access controller 90. In addition, system 18 includes a terminal interface 92 connected to a trailer tracking device 94 and a workstation 96.

Figure 6:
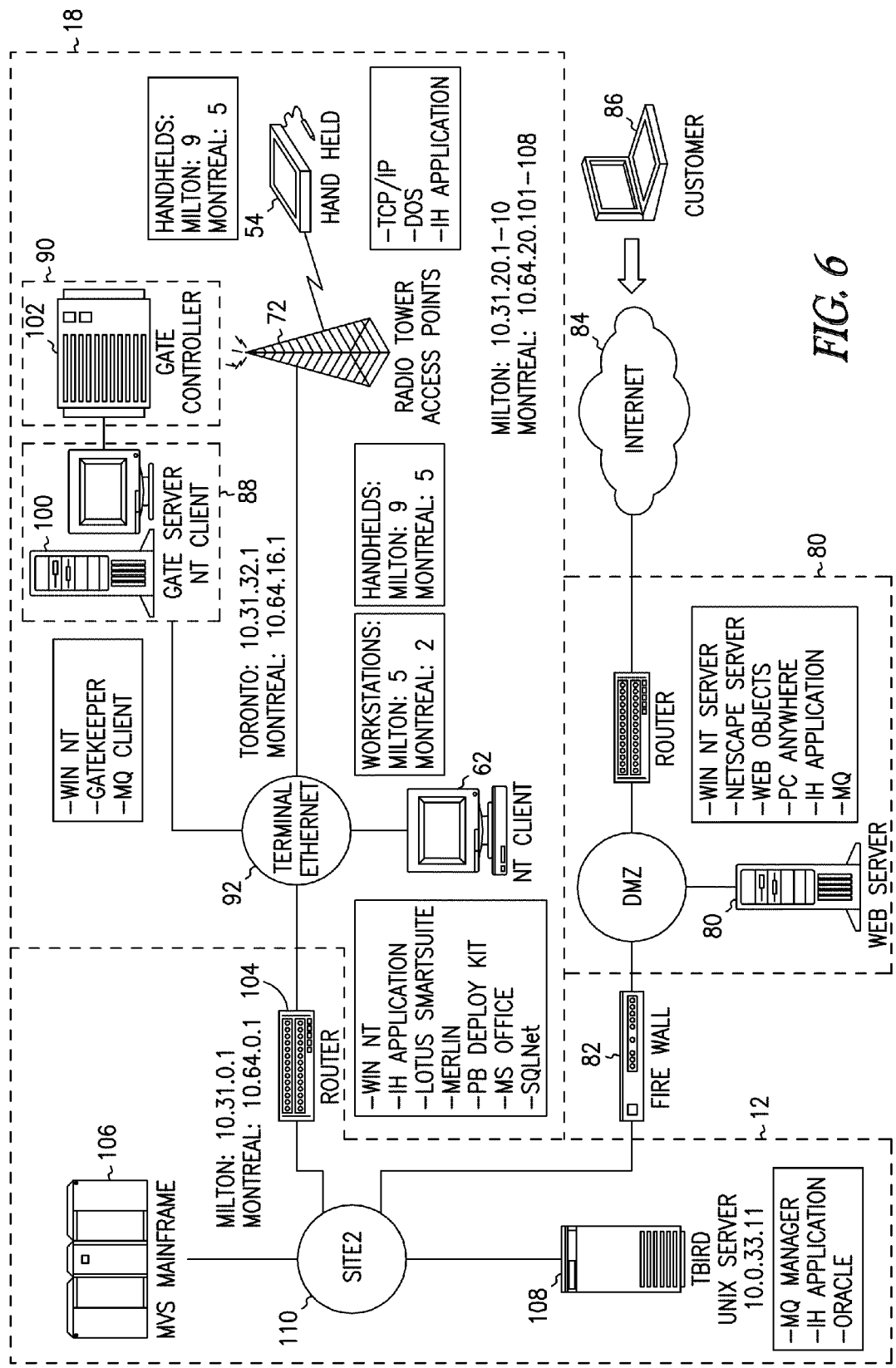

A more detailed illustration of a system 10 according to FIG. 5 is shown in FIG. 6. In FIG. 6, access controller 90 includes a gate controller 102 used to control the entry and/or exit gates. Access server 88 includes a gate server 100 connected to gate controller 102. Access server 88 may also be connected to other security devices throughout terminal 14.

Terminal interface 92 includes a local area network connected to one or more workstations 62 and to access points 72, which access points are in turn connected to handheld computers 54 (as shown in FIG. 4).

Figure 7:
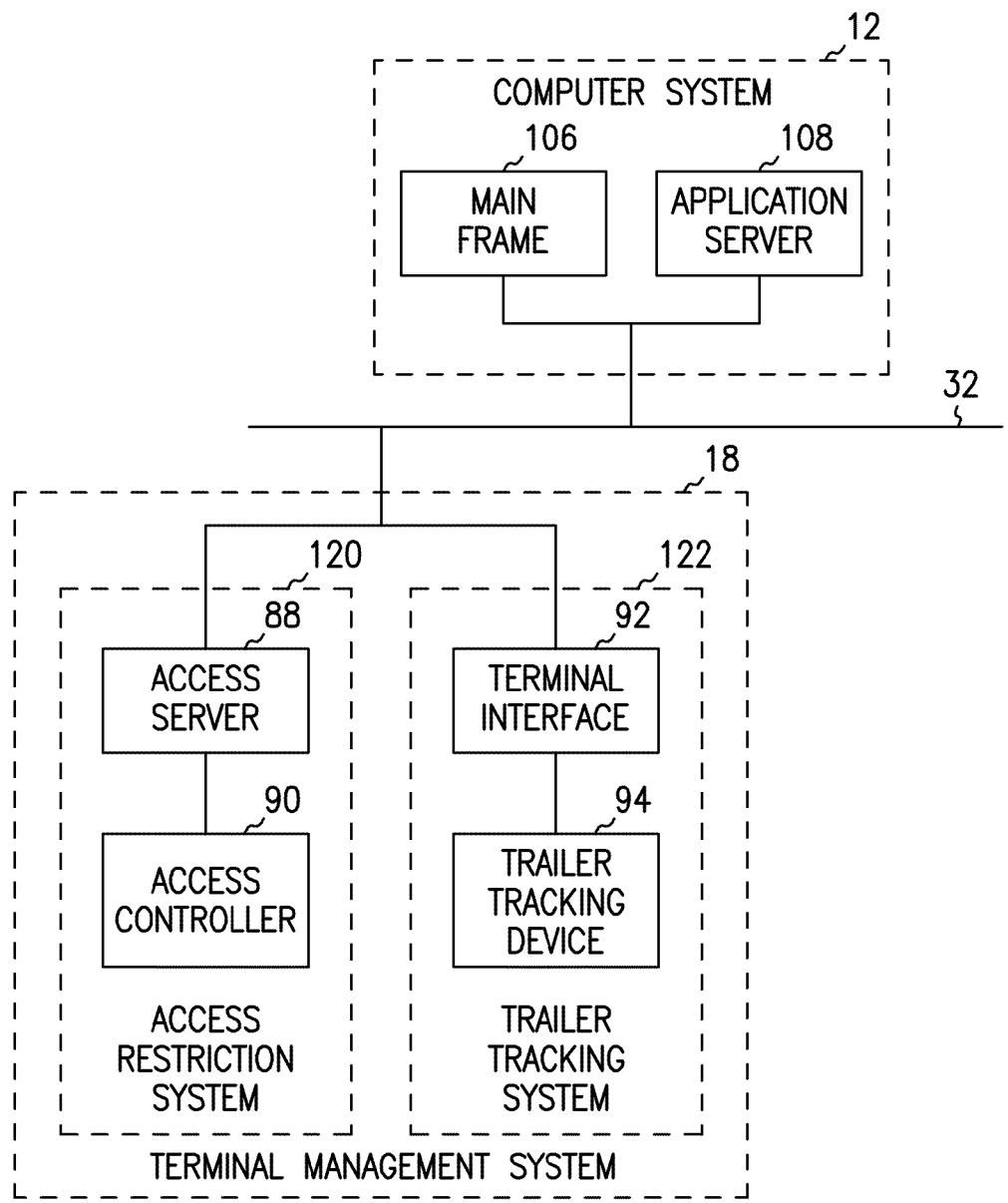

In the embodiment shown in FIG. 6, a router connects terminal management system 18 to a mainframe 106 and an application server 108 via a network 110. A simplified view of FIGS. 5 and 6 is shown in FIG. 7, where access server 88 and access controller 90 form an access restriction system 120 and where terminal interface 92 and trailer tracking device 94 form a trailer tracking system.

One embodiment of a software architecture useful in system 10 will be discussed next. In one embodiment, as is shown in FIG. 8, the application is made up of six components: application server 108, client workstations 62, customer access server 112, handheld computers 54, a mainframe 106 and an EDI server 114.

Figure 8:
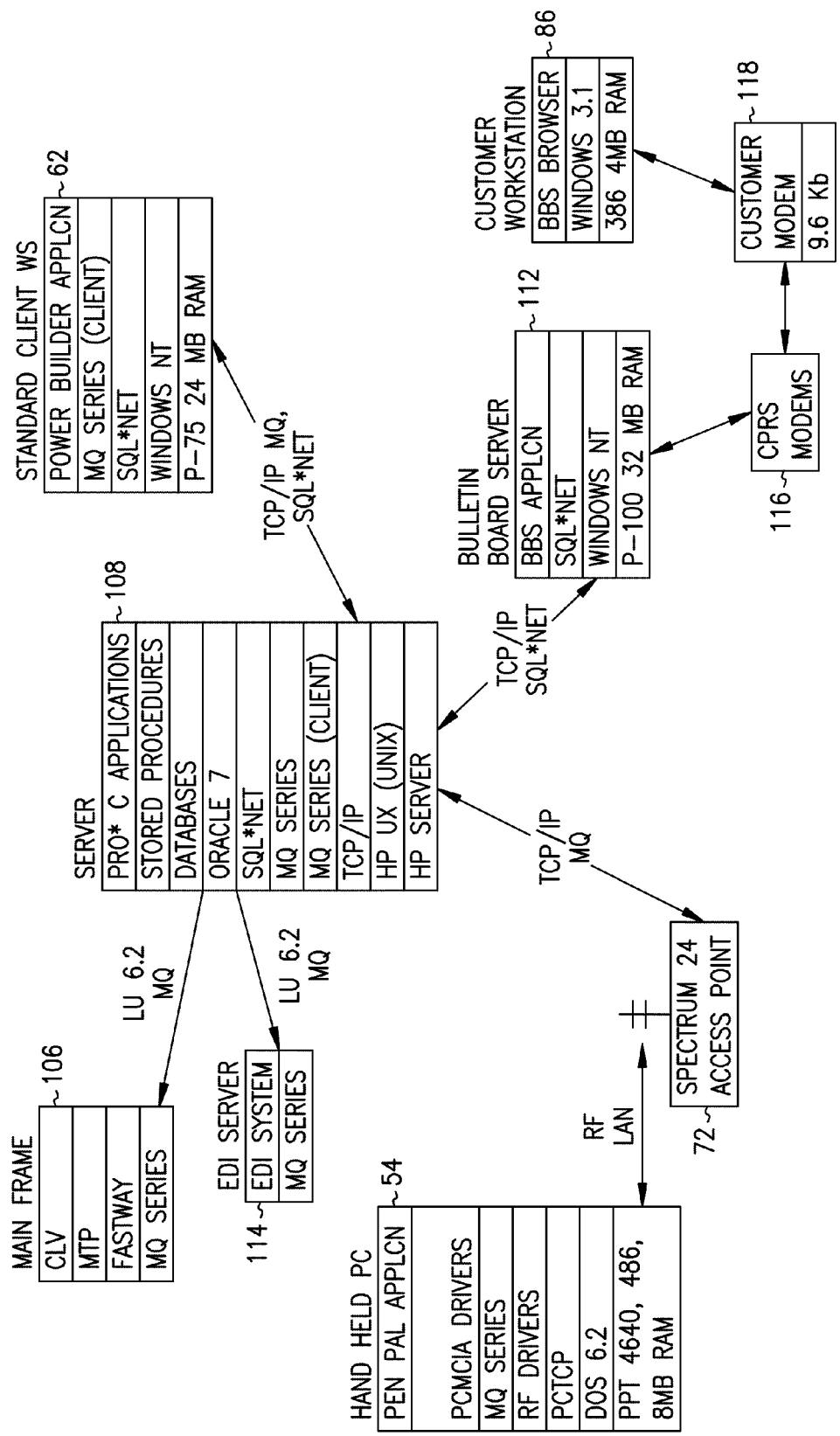

In the embodiment shown in FIG. 8, customer access server 112 is a bulletin board server connected to a customer workstation 86 through modems 116 and 118. In another embodiment (such as is shown in FIGS. 5 and 6), customer access server is a web server such as server 80 connected to a customer workstation 86 through WAN 84.

The following section describes the application functions that will be performed on each of the components.

In the embodiment shown in FIG. 8, application server 108 is a central server that stores all of the operational data. Oracle 7.x is the relational DBMS that manages the databases. Also running on server 108 is a back-end message receiving application that operates with the remote PC's in the terminal management facility.

In one embodiment, there are six MQ Queues set up on server 108. Each of the Queues has corresponding message processing programs written in Pro*C. The queues are:
1) Send bills of lading to FASTWAY
2) Send consist packages to CLV and MTP
3) Send EDI 214 messages to EDI server 114
4) Receive triggers from client workstations 62 to initiate the consisting and billing processes
5) Receive messages from the remote terminal workflow PC's 54
6) Send Messages to the remote terminal workflow PC's 54

In one embodiment, SQL*NET is used as the protocol to access the Oracle databases from the client workstations, the bulletin board server and the message processing programs running on the server.

In one embodiment, handheld computers 54 submit an EDI transaction set to computer system 12 when a trailer is loaded for transport. The waybill is then generated automatically based on the information in the transaction set.

In one embodiment, the Customer Access server 112 runs base bulletin board services to support connectivity via modem to the customer's computer 86. Within the BBS environment application specific programs execute to drive the bulletin board application. These programs are written in a combination of proprietary scripting language and Pro*C. The application accesses the corporate database using SQL*NET. Customer workstation 86 will only run the bulletin board browser application.

The client application was developed using Power Builder 4.0. In one embodiment, the application accesses the Oracle database via SQL*NET. The application programs perform edit checks and validations. In one embodiment, some business logic is performed on the client.

The application programs initiate Arrival, Departure, Billing and EDI Service exception notification processing via messages sent to programs on application server 108 using MQ Series. The business logic for these processes runs on application server 108.

EDI server 114 runs MQ Series to receive EDI messages from applications within or outside system 10. The application formats a message and sends it to EDI server 114. In one embodiment, the format of the message includes an identifier that EDI server mapping applications can use to identify the source and format of the EDI message. EDI server 114 translates the application message to an outbound EDI message format and then sends it.

Terminal workflow PC's 54 use the same device for both the hand held and the truck mounted operations. In one embodiment the user interface is based on Pen Pal. Remote PC 54 contains some application logic to support edit checking and input validation. The client sends update messages back to application server 108 via MQ series. A message processing program will reside on the application server 108 to perform the terminal management business logic.

In one embodiment, legacy mainframe applications (shown as Fastway, CLV and MTP) are sent bills of lading, consist packages and train arrival/departure times from application server 108. In one such embodiment, each of the application interfaces requires its own MQ Series queue to receive the information messages. The queue processing programs on the mainframe run as IMS transactions written in COBOL. In one such embodiment, each queue has its own transaction.

A matrix showing one mapping of business processes on the systems of FIG. 8 is shown in FIG. 9.

The following outline summarizes the components involved in one exemplary embodiment of system 10:

Hardware Components:

| | |
|---|---|
| Client workstations | Dell Pentium GXM5100 |
| Application server | IBM RS6000 |
| Gate server | Dell Pentium GXM5100 |
| Mainframe | MVS IBM ES9000 |
| Web Server | HP LH Pro |
| Access Points | Symbol Spectrum 24 Ethernet Access Point |
| Hand-held units | Symbol PPT4600 |
| Portable printers | Symbol RP3S |

Software Development Tools:

| | |
|---|---|
| Terminal Management System | PenPal 5.3 |
| Reservation Management System | PowerBuilder 4.0, Oracle PL/SQL |
| Internet Customer Access System | Web objects 2.0 |
| Gate System | Borland C++ |
| Mainframe Interfaces | COBOL |
| Server Message Receiving | Pro*C, Oracle PL/SQL |

Database Components:
  Oracle 7.3 RDBMS
Operating Systems:
  Windows NT 3.51
  UNIX
  DOS 6.0
Networking Components:

| | |
|---|---|
| Terminal LANs | 16 MBPS IBM Token Ring, 10 BaseT LAN Art Ethernet |
| Terminal Routers | Cisco |
| Ethernet Hub | LAN Art |
| RF Network | Spectrum 24 |
| Protocols | TCP/IP, SNA LU6.2 |
| Middleware | SQL*Net, MQ, Socket Communication |

As the move to client-server accelerates, the role of the mainframe will change from running on-line systems to heavy-duty batch processing and enterprise data storage. The use of client-server technology for system 10 is consistent with the industry trend and other projects in information technology.

In one embodiment, networking is based on the TCP/IP protocol. In one such embodiment, system 10 is an intranet made up of LANs and a WAN. Such an intranet allows higher speed communications between any network nodes and any applications supporting the TCP/IP protocol. In one such embodiment, TCP/IP is the native protocol for database communications between workstations or hand-held computers and the application server, file server and print servers (if required), and Windows NT networking. SNA LU6.2 is used between the application server and the mainframe interfaces. In one embodiment, customer access is via direct modem dial-up.

In one embodiment, the client-server infrastructure is designed to handle a wide range of data and transaction volumes, ranging from workgroups (10's of users) right up to enterprise levels (1000's of users). Processing power and data storage can be scaled in relatively small, cost-effective, increments. The same is mostly true of the network. WAN communications, because they comprise mostly leased circuits, are relatively simple to upgrade, but at incrementally higher cost for more bandwidth. On the other hand, LAN communications is relatively more difficult and costly to upgrade. However, this is generally not an issue because the existing applications are not, for the most part, LAN bandwidth limited.

Application scalability is highly dependent on design, involving the partitioning of data and processing, and making tradeoffs between local and global performance optimization. The application should be designed with scalability in mind unless it can be guaranteed that its use will not grow beyond initial expectations.

In one embodiment, the user interface is designed to follow Microsoft's Common User Access interface guidelines.

In one embodiment, a trust line splits the application architecture into two regions: an "access region" permitting flexibility to respond to individual user needs, and a "control" region where the enterprise rigidly applies enterprise validity rules to transactions to ensure integrity of enterprise data.

In one such embodiment, the access region includes the user desktop PC or workstation and the hand held PC's. The control region includes a server located at an off-site location. The trust line separating the two regions is drawn across the Wide Area Network connection separating the two regions.

In one embodiment, transaction management is handled by an Oracle relational database management system rather than through use of the CICS transaction processing monitor. MQ Series are used to support asynchronous communication between application server 108 and other internal company systems.

In one embodiment, system 10 is a client/server application based on a partial three tier model (partial in that use is made of proprietary Oracle features to handle most of the application layer). Presentation, data input edit checking, and application logic are on Hand Held 54, Desktop 62, and Customer Access Client machines 86. SQL is generated from the Client for Read, Delete, Insert, and Update access to Oracle tables. Stored Procedures and Pro-C programs resident on Server 108 are also used to Read, Delete, Insert, and Update Oracle tables.

The application logic and database data together with its referential integrity, business rules, stored procedures, and triggers reside on server 108. MQ Series, resident on server 108, are used to send data for update to EDI server 114 and the Fastway and Master Train Plan applications running on mainframe 106.

For Customers, who will be accessing the application via a BBS, only the BBS Browser is resident on Client 86.

In one embodiment, the structures of the programs generated via the use of the PowerBuilder product, are based as much as possible on standards. Metasolv's Powerframe product is used to aid in the program generation process. Similarly, existing standard routines are used to handle application errors wherever possible. Metasolv's Powerframe product is used to aid in the production of standard re-usable error handling routines.

Common Services

Wherever possible existing common services are used to perform required systems functions e.g. the existing TCP/IP based network for client/server communications; the internet infrastructure for customer to system 10 communication; existing systems management infrastructure for server management. Metasolv's Powerframe product is used to aid in the creation/provision of common services where necessary.

Wherever possible common re-usable modules are used to construct the application. Where they must be custom built they are constructed in accordance with internal company standards, and are potentially re-usable by other applications.

Operation

A simplified block diagram of system 10 is shown in FIG. 10. Trailer transport system 10 includes a network 130, a terminal management system 132 and a computer system 134. Terminal management system 132 and computer system 134 are coupled to the network 130. Trailer transport system 10 provides reservation, terminal and train management for an intermodal transport system. The computer system 134 provides data storage and server capabilities and interfaces with the terminal management system 132 to provide the reservation, terminal and train management. Terminal management system 132 enables reservation retrieval, access control to and from the terminal, trailer tracking to include check-in and check-out processes. Trailer transport system 10 operates to enable shippers who use conventional trailers to use rail as an option for transporting their trailers in a fast and efficient process. A customer makes a reservation with the railway company by phone, fax, internet, e-mail, post mail or the like. In the case of phone, fax or post mail the reservation information is input into the computer system 134 database via a user interface such as a keyboard.

In one embodiment, the terminal management system 120 includes an access restriction system 120 and a trailer tracking system 122 as shown in FIG. 7. Access restriction system 120 controls entry to and exit from terminal 14 as well as trailer tracking during check-in and check-out processes. When a trucker arrives at terminal 14 with a trailer for transport on a train and a reservation has already been placed, he pulls up to the entrance which is controlled by an access device such as a gate, a door or the like.

In one embodiment, server 108 stores the operational data in a back-end message receiving application. Automated interfaces extend through MQ to Customer billing and train consist mainframe systems.

In one embodiment, customer service representatives access the reservation system through Windows NT workstations to manage reservations, setup operating trains, and track customer shipments. A Web server such as server 80 enables customers to create reservations and track shipments online.

In one embodiment, radio frequency (RF) technology is used to communicate with a pen-based application running on portable computers 54, creating a paperless environment to manage terminal operations in the rail yard.

In one embodiment, an intermodal transportation system includes two or more specially designed terminals 14. Each terminal includes a Token Ring local area network (LAN) that connects the client workstations, the gate system, and the RF network. The gate system controls and manages security for the entry and exit gates. The RF wireless network consists of external access points mounted throughout the yard providing an RF coverage are for communications with the handheld units. The access points are connected by fiber optic cables to an Ethernet FiberLink HUB, networked to the LAN through a router. The LAN is connected to the central server via a router, providing access to the application server and mainframe.

Reservation Management

One embodiment of a reservation system will be described in the context of FIGS. 11-18. In the embodiment shown the Reservation System is an application that facilitates scheduling trains, creating and confirming reservations, maintaining customer information and reporting. These functions are performed mainly by Customer Service Representatives working with workstations 62.

This discussion will focus on the of the Reservation Component of the reservation system, a facility through which Customer Service Representatives create, confirm, review and cancel trailer reservations on a specific scheduled train. Specifically, the following areas will be described: Reservation Search, Reservation List, Reservation, and Confirmation.

In one embodiment, reservations are made for a specific train, for a specific origin and destination, and for a specific number of trailers and pups (trailers 30 feet and shorter). System 10 makes sure that there are enough spaces on the train for the reservation. In one embodiment, if system 10 finds that there in not sufficient space, the reservation will still be made; the shipment will, however, be placed in stand-by status only.

In one embodiment, for each trailer/pup within a reservation, the customer must make a confirmation. The confirmation records information regarding the trailer (size, type, etc) as well as details regarding the shipment, such as the weight, commodity code, commodity description, package type, broker, actual shipper, and actual consignee.

Periodically, trailers arrive at the terminal without a prior reservation. These trailers are checked in via the hand held application, and are moved to their destination on a space available basis.

Figure 11:
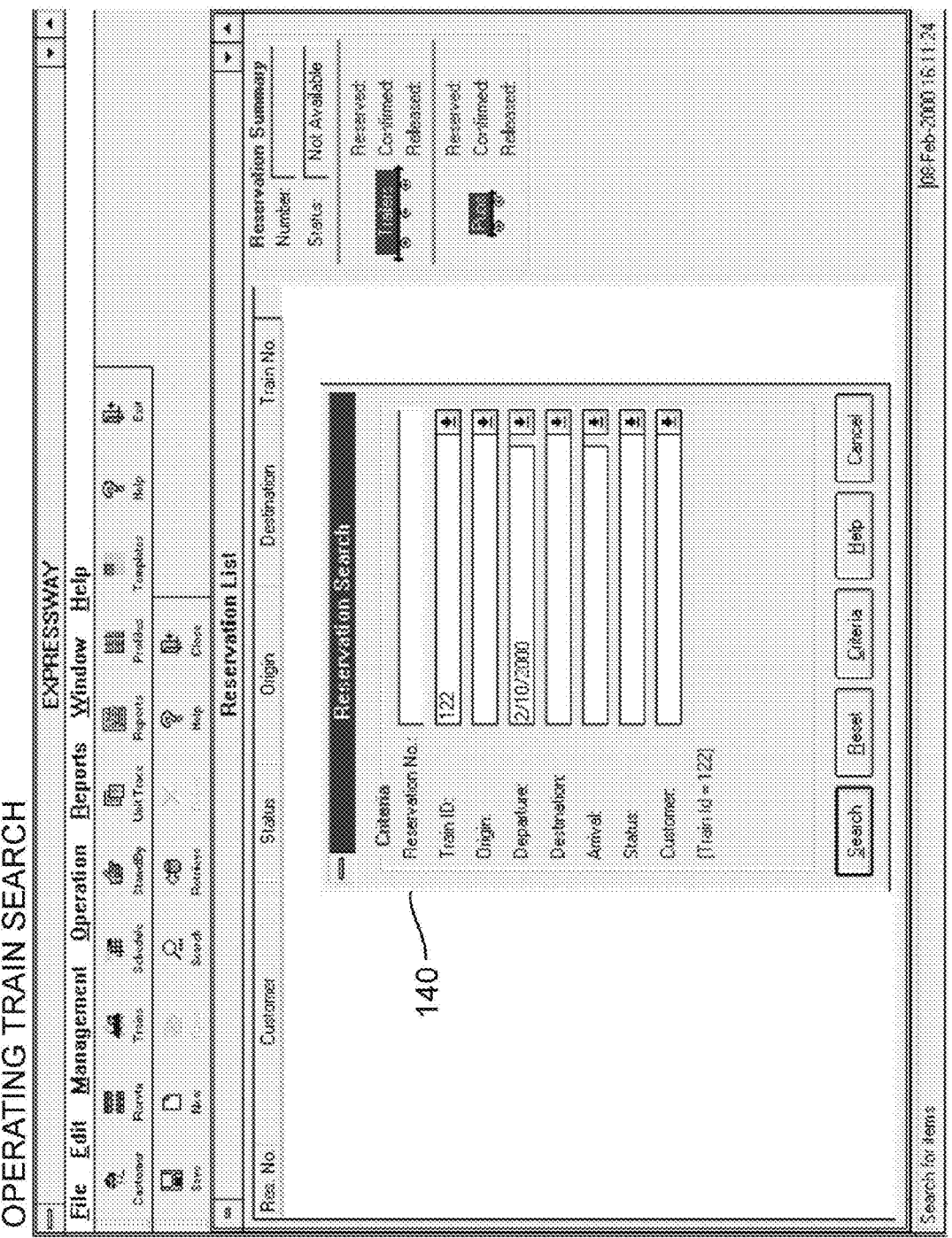
Figure 12:
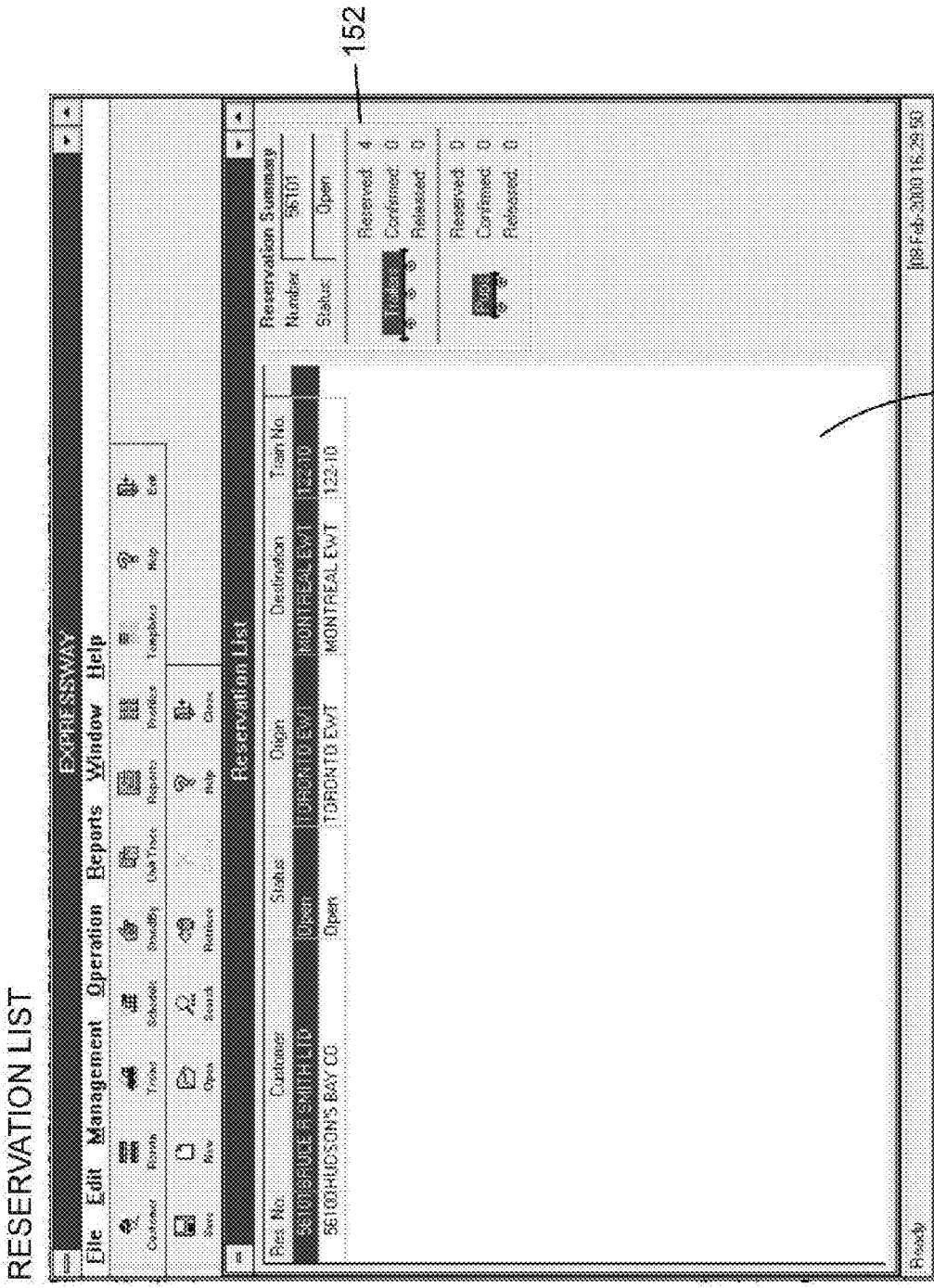
Figure 15:
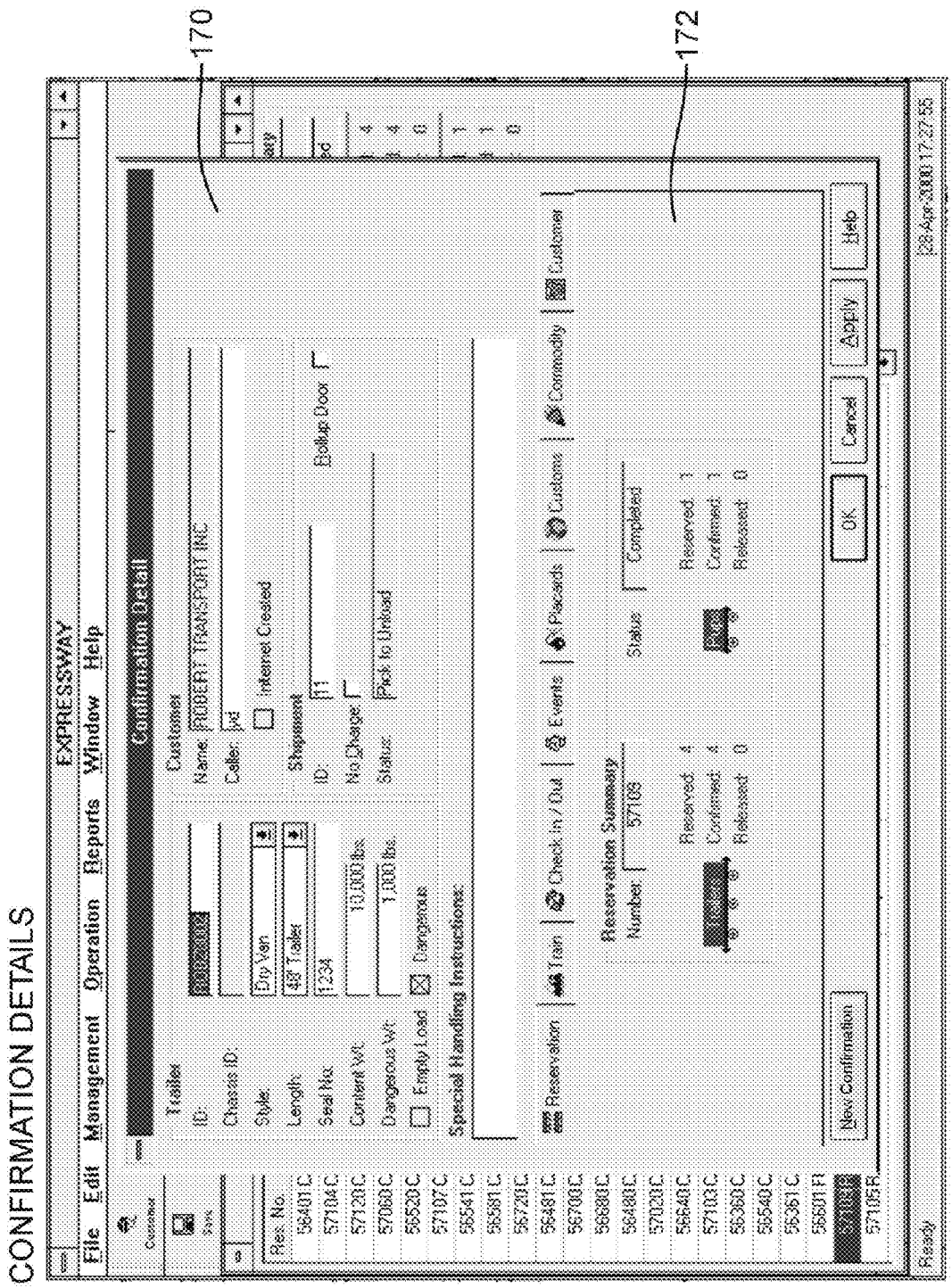

In one embodiment, a reservation search window is used to search for and display summary information about one or many customer reservations. Such a window 140 is shown in FIG. 11. In the embodiment shown, reservations are searched for and displayed based upon the following information: CPR's Reservation Number, Train ID, Origin Rail Station, Departure Date, Destination Rail Station, Arrival Date, Reservation Status, and Customer ID.

Reservation list window 150 (shown in FIG. 12) holds the results of the reservation search. In the embodiment shown, the following summary information is returned for each reservation matching the search criteria: Reservation Number, Customer, Reservation Status, Origin Rail Station, Destination Rail Station, and Train Number. Additionally, when a reservation is highlighted, the number of reserved, confirmed, and/or release trailers and pups is displayed in the Reservation Summary 152 on the right hand side of the screen.

In one embodiment, reservations are made by a customer for a specific train on a specific day for a specific number of trailer places, provided that space is available. If space is not available, the system will still record the reservation, but the reservation will be held on the wait list.

Figure 13:
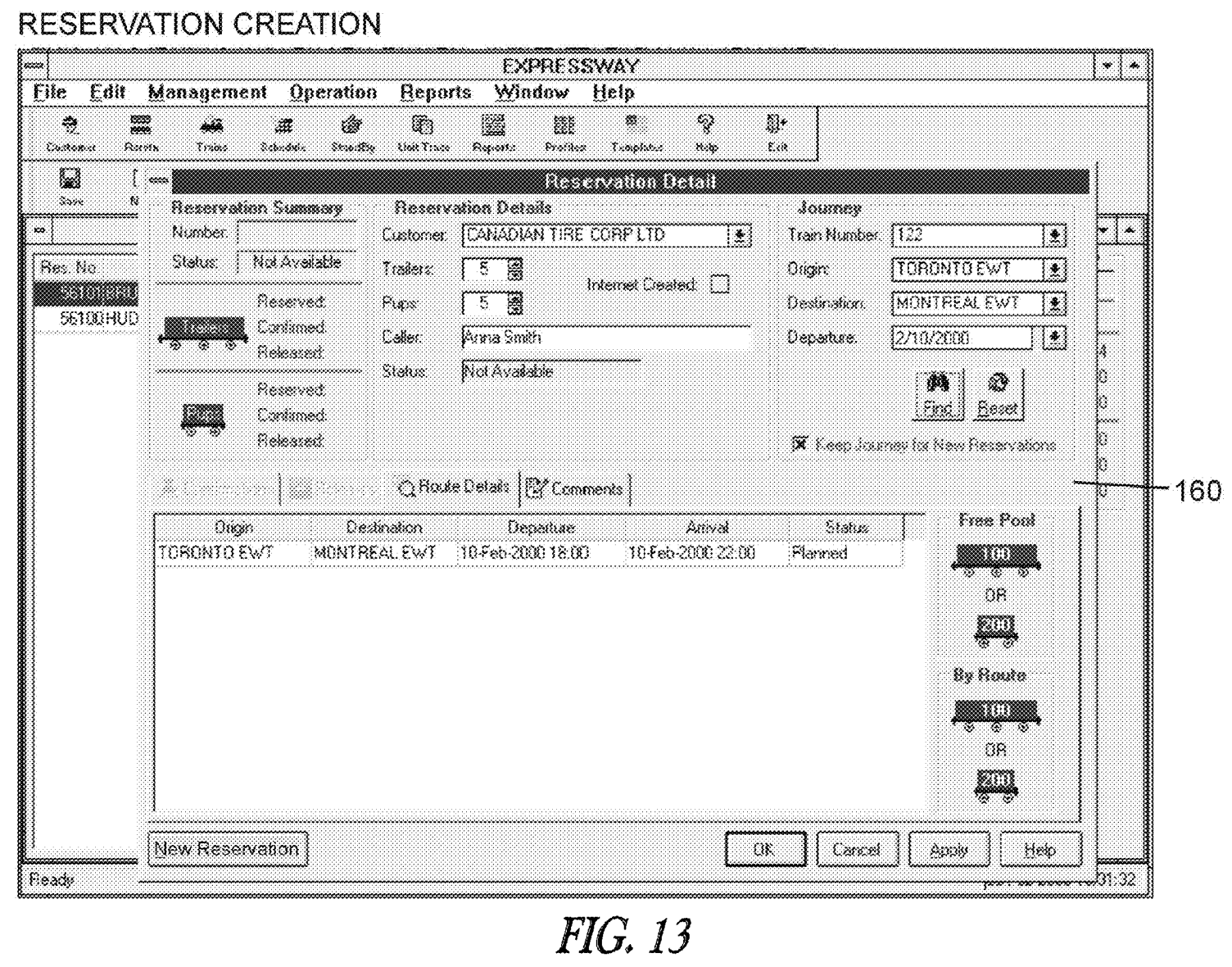

In one such embodiment, a customer enters reservation information on a reservation window such as window 160 in FIG. 13. A customer is not obliged to fill all the spaces he has reserved. Any spaces that are no longer required by the customer can be released, opening up spots of the train for any reservations on the wait list, or, for trailers that are on standby.

In one embodiment, reservations can be made days, weeks, even months in advance. As well, the customer can have a perpetual reservation set up for specific days, trains, and time periods.

Once a reservation is created, the system assigns a reservation number which is given to the customer for future reference. A completed reservation is shown in reservation window 162 in FIG. 14. The reservation number is shown in field 164. Status is shown in field 166.

Figure 16:
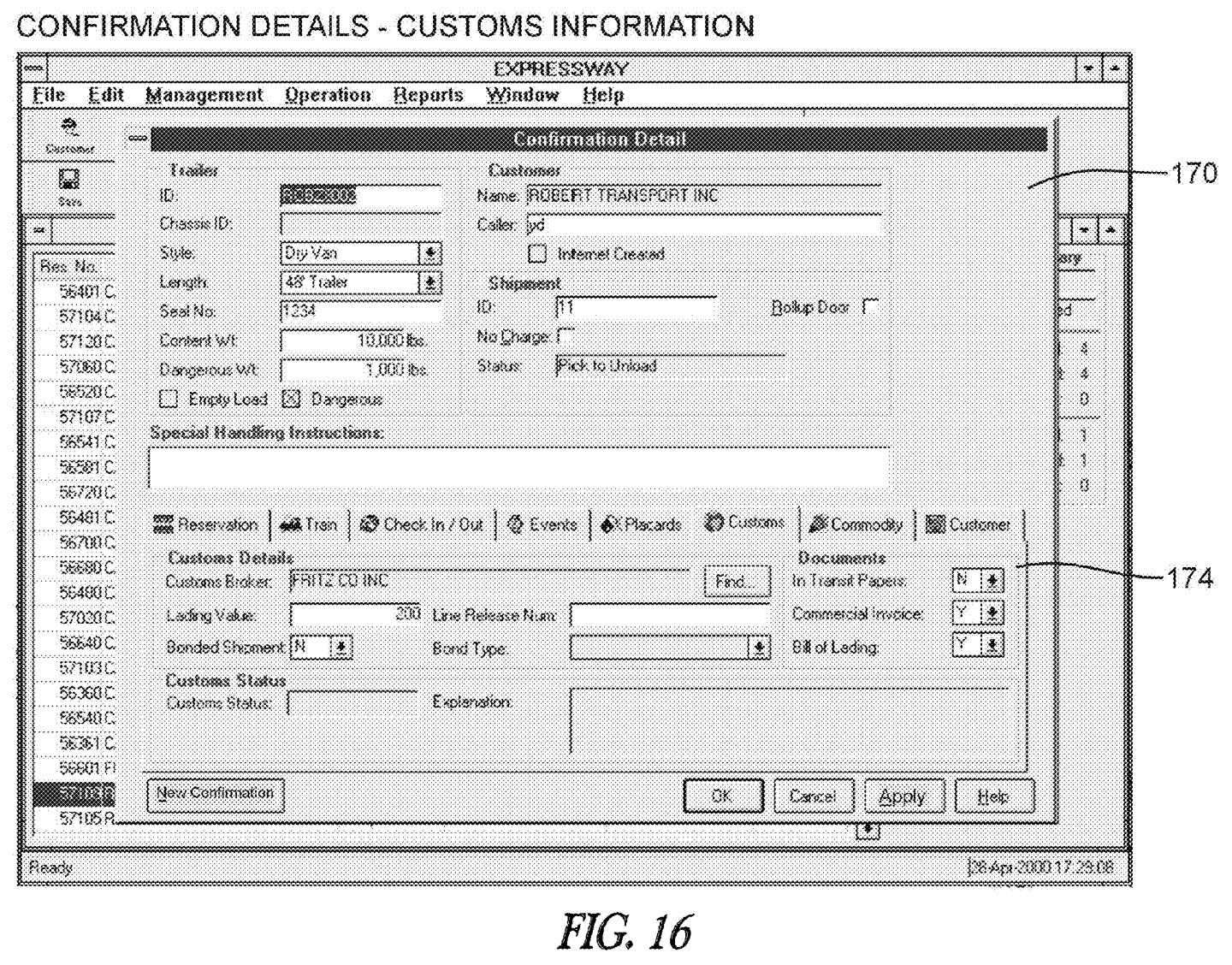
Figure 17:
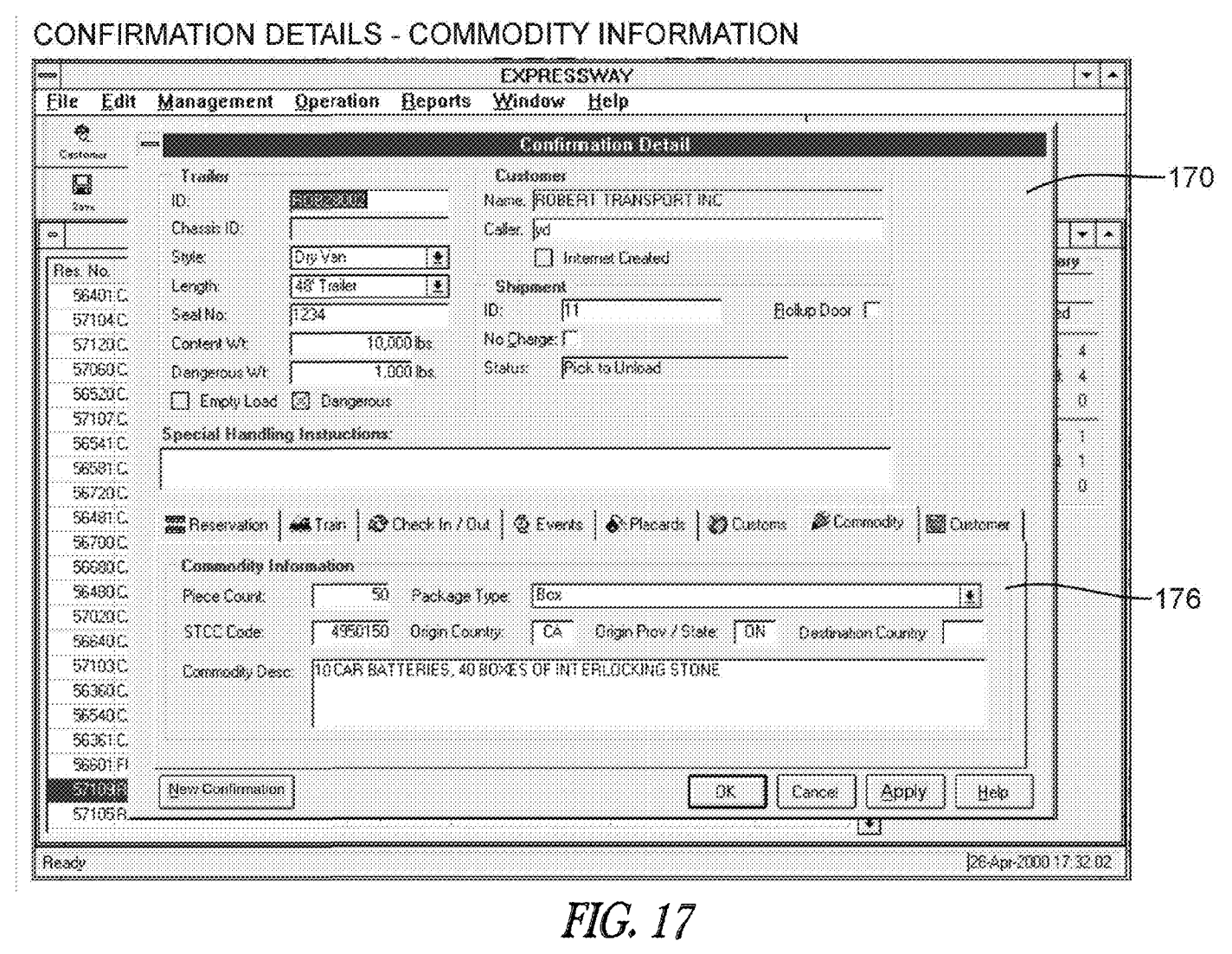
Figure 18:
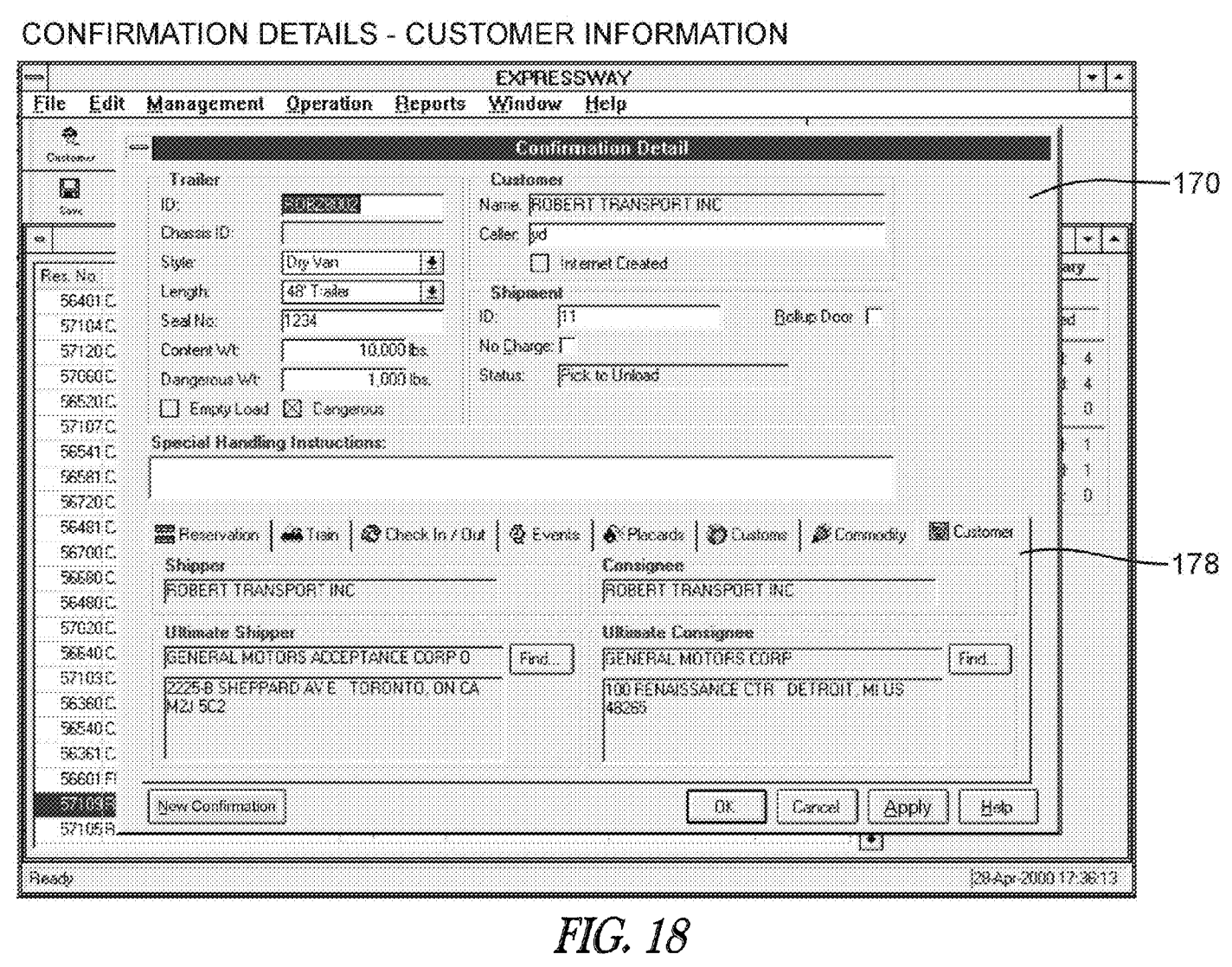

In one embodiment, confirmations are created close to the day of departure and they record specific details regarding each trailer to be shipped as well as the goods within the trailer. An example of a confirmation is shown in FIGS. 15-18, where a window 170 is displayed showing the data associated with the trailer or trailers to be shipped. Window 170 has a number of sub-windows associated with specific areas of information. For instance, FIG. 15 displays a reservation window 172 which shows the status of the reservation. FIG. 16 shows a customs window 174 which shows customs information. FIG. 17 shows a detail window 176 showing specific details about the shipment. FIG. 18 shows a shipper and consignee window 178.

For domestic shipments, the data requirements are minimal; trailer details, as well as the weight and the commodity code are only required.

For cross-border shipments, however, the data requirements are more stringent. The customer must provide specific details regarding the goods within the trailer (piece count, package type, commodity description, and country and province/state of manufacture), the actual shipper and consignee, as well information such as the customs broker and estimated shipment values. Without this information, the shipment will not be allowed to cross the border. As such, the application includes an edit function to ensure that all the required data is captured before the confirmation is listed as complete.

In this embodiment, all the information captured on a confirmation is subsequently used as a basis to create the waybills and Canada/US Customs manifests.

Train Management

In one embodiment, train-related processes such as actual equipment assignments, train arrivals and departures are controlled using Hand-held computers 54 within terminal 14. In one such embodiment, this is accomplished using the PowerBuilder client application.

RF System

Figure 19:
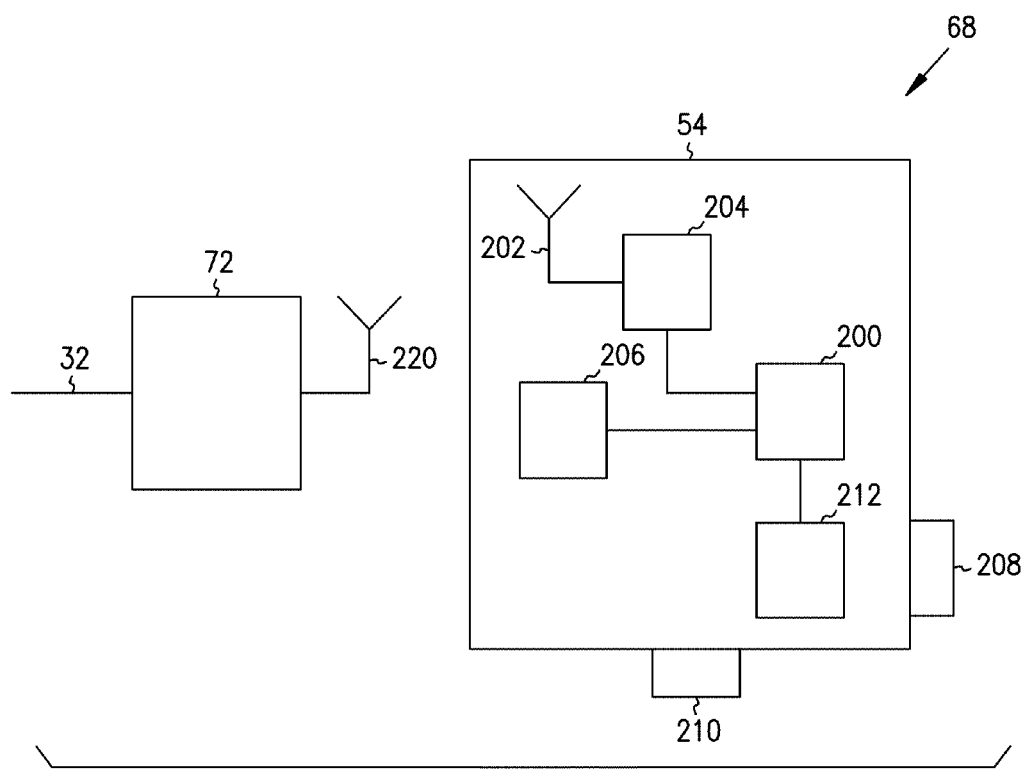
FIG. 19 is a block diagram of an RF network.

One embodiment of RF system 68 is shown in FIG. 19. In FIG. 19, computer 54 includes a processor 200 (e.g., a 486), an internal antenna 202, an internal RF card 204 connected to antenna 202, a 2 MB ATA card 206 for data storage, built in laser scanner 208 for scanning functionality, screen interface 212 and connector ports 210 (for, e.g., a keyboard, A/C power adapter, printer, etc.).

Each access point 72 is connected to a 4-port Ethernet Hub connected to the Terminal Token Ring Network via a router. Each access point 72 includes an internal or external antenna 220 for radio transmission and reception. The group of access points defines the cellular coverage area where the radio-equipped mobile units can establish communications. In one such embodiment, symbol technology's spectrum 24 wireless LAN (operates between 2.4 to 2.5 GHz) is used.

Access Restriction System

In one embodiment, entry and exit gates operated by gate controller 102 and gate server 100. In one such embodiment, gate server 100 communicates with gate controller 102 through a serial connection and also directly connects to the Terminal Token Ring Network 32. A gate controller hardware component within each gate sends and receives data from the gate server to operate the gate arm.

In one embodiment, at entry the entry ticket number is sent to gate server 100 to be matched with a reservation displayed on handheld 54. At gate exit, the exit code is validated with a matching entry ticket number. In addition, exit gate can be designed to operate manually as well with the use of a remote control device.

In one embodiment, gate server 100 provides a monitoring facility to track the traffic through the entry and exit gates and also runs two background processes that receive the scanned gate exit codes and update the times to the Oracle database through the MQ client communication protocol.

Application Architecture

As noted above system 10 represents a significant change in the way intermodal transportation operates, enabling shippers who use conventional trailers to use rail as an option for transporting their trailers without the need to modify their equipment. In one embodiment, system 10 employs client server technologies, consisting of a tightly integrated set of applications; Reservation Management, Train Management, and Terminal Management.

In one embodiment, system 10 software consists of three applications: PowerBuilder integrated system, Hand-held PenPal, and Internet Customer Access.

In reservation management, a client PowerBuilder application can be used to create, modify, cancel and confirm customer reservations. Customers also have access via the Internet to a Customer Access application to modify their reservations and track shipment progress.

In terminal management, terminal workflow processes such as trailer check-in and check-out are processed using Hand-held technologies. This system enables a 15 minute through put time of customer traffic through the terminal, by creating a paper less environment.

In train management, system 10 trains can be created, planned equipment assignments made, and tracking of shipments by train, can be done using the PowerBuilder client application. The train related processes such as actual equipment assignments, train arrivals and departures are controlled using Hand-held technologies within each terminal 14.

The Application Architecture describes all the major server processes, databases, and interfaces to other systems. The communication protocols are also described for each process. A reference diagram displaying the relationship of all the Iron Highway processes is included in the Appendix B.

In one embodiment, application server 108 is a production server connected via an LU 6.2 line to the Site2 Token Ring Network. Application server 108 contains a database storing all the operational data, using Oracle as the RDBMS for data management. The application server communicates with the components through communication protocols including SNA Lu6.2, MQ,TCP/IP, and SQL*NET. A message processing application consisting of Pro*C programs runs on the server for database access and interface processing. The business logic for these processes reside on the server. The following functions are performed by the back-end server processes:

Processing of all requests from the hand-held units
Perform Gate exit time updates to Database
Transmitting of EDI Bill of Lading information to the Fastway system
Send Train consist package to Train Information system
Retrieval of Train Information from Master Train Plan (MTP) system An MVS Mainframe 106 connects to the Site2 Token Ring Network via an LU 6.2 line. System 10 interfaces to legacy systems residing on the Mainframe: Master Train Plan (MTP), Train Information System (Train II), and Fastway. Train information is retrieved from MTP's Operating Plan and updated to the system 10 database daily. In return, train departure consist data is sent to the Train Information system via the CLV subsystem. Following each Train departure, Bill of Lading information is sent to the Fastway application for customer billing.

In one embodiment, each terminal 14 includes consists of NT Client Workstations 62 connected to a local Token Ring Network 32. The workstations are mainly used by the staff to access the system 10 integrated application, update Fastway and MTP thru Merlin SNA, and for reporting purposes using Microsoft Office. In one embodiment, an external 14,400 bps Fax/Modem connects the Customer Service Representative (CSR) workstations in order to send Train Delay Notifications via the system 10 application. The client workstations communicate with the application server through SQL*NET for database requests.

In one embodiment, each terminal 14 includes five PPT4600 hand-held portable PCs 54, and three RF network transceivers 72 known as Access Points. The cellular network employed is Symbol Technology's Spectrum 24 wireless LAN that operates between 2.4 to 2.5 GHz.

The PPT4600 hand-held PC 54 is manufactured by Symbol Technologies. As noted above, it is a 486 portable wireless computer with an internal antenna for radio transmission and reception to and from the Access Points. The unit is equipped with an internal RF card connected to the antenna, and a 2 MB ATA card for data storage. External features include a built in laser scanner for scanning functionality, and three connector ports for a keyboard, A/C power adapter, and a printer. Hand-held unit 54 contains the Terminal Management application which sends all message requests to the application server through the TCP/IP socket communication protocol.

Access Points 72 are connected to a 4-port Ethernet Hub, which is connected to the Terminal Token Ring Network via a Router. The Access Points are installed with a single external antenna for radio transmission and reception, creating a wireless network for the mobile units by bridging the Ethernet and Radio Network. The group of Access Points 72 define the cellular coverage area where the radio-equipped mobile units can establish communication.

In one embodiment, terminal 14 entry and exit gates are operated by gate controller 102 and gate server 100. Gate server 100 communicates with gate controller through a serial connection and also directly connects to the Terminal Token Ring Network.

Gate server 100 provides a monitoring facility to track the traffic through the entry and exit gates and also runs two background processes that receive the scanned gate exit codes and updates the times to the Oracle database through the MQ Client communication protocol.

The system 10 central application server 108 stores all of the operational data in an Oracle 7.3 database, instance IHP. The IRF database is also accessed by the Iron Highway application. The data is manipulated by subsystems by communicating with the back-end message receiving application. There are MQ queues setup using the MQ production manager MQP06. These server queues trigger the corresponding back-end Pro*C programs to effectively communicate to the Hand-held, Gate server, Web server, and Mainframe subsystems. The message processing application consist of the following programs developed in Pro*C: IH_IHSA, UPD_CKOUT, IH_CON, IH_440TX, IH_MTP. In one embodiment, each program resides in the /PROD/IH/BIN path and can be re-started using the IHMGR userid or using SU-IH-MGR for superuser access.

The IH_HSA back-end process communicates with the hand-held units to process all the Train and Terminal Management requests from the hand-held units. The process was developed in Pro*C and sends and receives messages through the TCP/IP Socket communications protocol. For each request, the hand-held application sends the corresponding transaction to IH_HSA for processing. Depending on the hand-held request, IH_HSA will call the appropriate 'C' function or update an MQ queue on the server for further processing. The following list summarizes the main processing that IH_HSA performs:

1) The Check_Connect process is called to validate the login Oracle userid and password.

2) The corresponding 'C' functions are called to process hand-held data requests on IHP.

3) Resulting data sets are sent back to hand-held from IHP.

4) The Trailer scanned gate entry times are updated in database on IHP and the corresponding exit_code.IN file is sent to an MQ queue for further processing by the Gate server process Tk_ckin.

5) Upon Train departure, a trigger message is sent to the MQ server queue IH.IF.CONSIST, initiating the interface to the Z9 system by the Ih_Con process.

6) Upon Train departure, a trigger message is sent to the MQ server queue IH.IF.FASTWAY for further processing by the Ih_404tx process.

The UPD_CKOUT back-end process reads the gate exit times and updates the database on IHP. The program was developed in Pro*C and is triggered by an MQ server queue IH.HH.GATE.IN. As the Terminal gate is exited using the exit codes, the gate server process Tk_ckout sends a trigger message to the server queue and subsequently triggers the UPD_CKOUT process to update the database on IHP. Tracking of the gate exit times is essential to determine if the Terminal throughput times is within the acceptable limit.

The IH_CON back-end process is responsible for processing the Train departure consist package. The program is developed in Pro*C and is triggered by the MQ server queue IH.IF.CONSIST. Once the Train Departure event occurs, the IH_HHSA process sends a trigger message to the queue, subsequently trigger the IH_CON process to fetch the train consist information from the database on IHP. The train consist data is sent to the MQ server queue IH.IF.CONSIST.REQUEST for further processing by the mainframe consist program that interfaces to the Z9 system.

The IH_404TX back-end process retrieves customer Bill of Lading (BOL) information from the database on IHP and sends the data to an MQ server queue. This process is developed in Pro*C and is triggered by the MQ server queue IH.IF.FASTWAY. When a Train departure event occurs, the IH_HSA process will send a trigger message to the MQ server queue, triggering the IH_404TX process to retrieve customer BOL information from the database on IHP. The bill of lading (BOL) data is sent to the MQ server queue IH.EDIBOL.WAYBILL which triggers a Fastway mainframe transaction to create a waybill for customer billing.

The IH_MTP back-end process is developed in Pro*C and is an XCOM scheduled program that runs daily between 0800-1100 am. The IH_MTP process reads the a flat file consisting of MTP's Operating Plan and updates the database on IHP. The Train Titan number, Train Symbol, and an associated consist number are updated for each Train in the database on IHP. In one embodiment, the entire retrieve/update process takes about three hours every morning.

Mainframe Interfaces

System 10 interfaces to three of CP's legacy mainframe systems: Fastway (Customer Billing application), Train Information System (Train II) (a train reporting application) and Master Train Plan (MTP) (a train scheduling and planning application).

Server 108 processes send trigger messages to MQ Server queues which correspond to IMS queues on Mainframe 106. Once the IMS queues receive the messages, the corresponding IMS transaction is triggered on Mainframe 106. In one embodiment, mainframe programs are developed in COBOL and run in IMS1.

The Fastway interface will be described next. Following the Train departure event, the MQ Mainframe queue IH.EDI-BOL.WAYBILL is filled with customer Bill of Lading (BOL) information. The MQ queue subsequently triggers an IMS transaction which sends the BOL data to the Fastway system for Customer Billing purposes.

The Train Information System Interface will be described next. Following the Train departure event, the MQ Mainframe queue IH.IF.CONSIST.REQUEST is filled with the Train consist package. The triggered IMS transaction is HIT001 which retrieves the consist information and sends it to the Z9 subsystem CLV through the common module CLVMOVED. The consist package is moved into the Train II database and a record is stored in the Z9 menu, IRON. The Train consist data can be viewed through the Train II system by entering/For Train or through the Train Lineup function in MTP. After fourteen days, consist information is purged from the Train II database.

The Master Train Plan (MTP) stores the Train Operating Plans in a dataset on mainframe 106 on a daily basis. The IMS transaction HIT002 is a scheduled batch job that runs daily to create a copy of MTP's Operating Plan to a flat file on the application server. This flat file is retrieved every morning by a server back-end process, to update the Train titan number and Train symbol to the database.

System 10 Desktop Application

The system 10 desktop application is an integrated system consisting of Train Reservation, Train Management, and Reporting functionality, in one embodiment, the application was developed in PowerBuilder version 4.06 and runs under the Windows NT operating system. The core ancestor application components were developed using the external class library PowerFrame. The PowerFrame security utility is used to control end-user security accesses for the application.

The PowerBuilder application communicates with the Oracle database through the SQL*NET protocol. Operational data is retrieved from the database on instance IHP within server 108 and customer information is retrieved from the IRF database tables. The application also performs edit checks and validations on retrieved data. The NT client workstations require SQL*NET and the PowerBuilder version 4.06 deployment kit installed, in order to run the application.

System 10 Hand-Held Application

The Hand-held application controls the Terminal and Train Management processes. In one embodiment, the application is developed in PenPal and runs in the DOS 6.2 operating system. For each Hand-held request, a trigger message is sent via the TCP/IP socket communications protocol to the back-end server program IH_HSA for further processing. The hand-held units communicate through a Spectrum 24 RF network to the Ethernet access points. The hand-held application also consists of edit checks and validations on data retrieved from the database on instance IHP.

Gate Application and Processes

The control and monitoring of the Terminal Gates are implemented by both the Gate Keeper application and two back-end processes.

The Gate Keeper application runs under Windows NT and was developed by the vendor Auto Car Park. This application interfaces with the exit and entry gates by communicating with the gate controllers. The Gate Keeper application controls the Exit gate through validation of the manually entered exit codes by checking for an existing .IN file in memory. Once the exit code is validated, a .OUT file is created in the /ExitLog directory on the Gate Server. The application also includes a monitoring utility to view all activity through both the Entry and Exit gates. Employee Gate exit codes can also be managed through the application.

The back-end gate processes consist of two 'C' programs that retrieve and send exit codes from MQ queues on the application server. The TK_CKIN program will read the MQ queue IH.HH.GATE.IN every 30 seconds to retrieve existing Exit Codes that were scanned during the Trailer Checkin process. The program will retrieve the Gate exit codes and create .IN files in the Gate server /Ticket directory. The TK_CKOUT program will retrieve exit codes by checking for existing .OUT files every 60 seconds. The .OUT files are moved to the /EXITHIS directory and the exit codes are sent to the MQ queue IH.HH.GATE.OUT for gate exit time updates to the database.

In one embodiment, during the gate entry the IH_HSA process updates the gate entry time to the database and sends exit code to the MQ server queue IH.HH.GATE.IN. The TK_CKIN process retrieves the exit code and creates a corresponding .IN file which is stored in the Gate Keeper application's memory.

At gate exit, the Gate Keeper application validates the manually entered code by checking for an existing .IN file in memory, and creates a corresponding .OUT file.

The TK_CKOUT process moves the .OUT to the /EXITHIS directory and sends the gate exit time to the MQ queue IH.H-H.GATE.OUT triggering the UPD_CKOUT process on the application server to update the database.

Web Application

The Customer Access application allows system 10 customers to dial in through the internet to make Train reservations and to track their shipments. The Web application was developed using Web Objects and uses MQ Client as the communication protocol to access the database.

In the above discussion and in the attached appendices, the term "computer" is defined to include any digital or analog data processing unit. Examples include any personal computer, workstation, set top box, mainframe, server, supercomputer, laptop or personal digital assistant capable of embodying the inventions described herein.

Examples of articles comprising computer readable media are floppy disks, hard drives, CD-ROM or DVD media or any other read-write or read-only memory device.

CONCLUSION

The above-described intermodal transportation system does not compete against truckers, but rather partners with them. One of the most important things truckers are looking for is on time, fast and reliable service. Tests have shown that the integrated intermodal transportation system should provide an on-time performance average of at least 95%.

In addition, the use of information technology in terminal operations has helped revolutionize and simplify the process by which trailers are transferred from truck to rail. For instance, the hand-held computer technology has eliminated paperwork for the customer and, combined with the automated reservation system, has limited the time he/she spends in the terminal to 15 minutes or less.

In addition to the railroad and trucking industries, the general public is another stakeholder with much to gain from shifting intermodal traffic from the highway onto the rails. As an environmentally-friendly transportation route, this approach takes trucks off already congested highways, reducing road wear and maintenance costs to taxpayers Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof.

What is claimed is:

1. A trailer transport system for tracking trains having a plurality of rail cars, wherein each rail car can transport a trailer, the system comprising:
    a computer system having a trailer tracking program, wherein the trailer tracking program receives information regarding a trailer to be transported and stores the information in a record; and
    a plurality of railway terminals, wherein each railway terminal includes means for receiving a train having a plurality of rail cars and means for receiving trailers to be loaded on the rail cars and wherein each railway terminal includes a railway terminal management system communicatively connected to the computer system, wherein the railway terminal management system pulls up the record corresponding to the trailer to be transported when the trailer arrives at the terminal and modifies the record to reflect the trailer's transportation status.

2. The system according to claim 1, wherein each terminal includes a track and a loading pad crossing the track to facilitate rapid loading and unloading of trailers from the train.

3. The system according to claim 1, wherein the computer system includes a reservation system for reserving a slot on a train, wherein the reservation system operates in conjunction with the trailer tracking program to ensure that a trailer to be transported is placed on its assigned train.

4. The system according to claim 1, wherein the terminal management system includes a trailer tracking system connected to the computer system over a network.

5. The system according to claim 4, wherein the trailer tracking system includes a terminal interface coupled to the network.

6. The system according to claim 4, wherein the computer system includes a network and wherein the trailer tracking system includes a terminal interface coupled to the network and a hand held computer unit wirelessly coupled to the terminal interface.

7. The system according to claim 4, wherein the trailer tracking system comprises a portable computer.

8. The system according to claim 1, wherein the terminal management system includes a trailer tracking device, wherein the trailer tracking device is a handheld computer connected to the computer system over a wireless communications channel.

9. The system according to claim 1, wherein the terminal management system includes an access restriction system which restricts access to physical locations within the railway terminal.

10. The system according to claim 9, wherein the access restriction system includes a gate and a gate controller, wherein the gate controller operates in conjunction with the computer system to restrict access to the terminal.

11. In a trailer transport system having a computer system and a plurality of railway terminals, including a first and a second railway terminal, wherein each railway terminal is configured to receive trains having a plurality of rail cars and to receive trailers to be loaded on the rail cars, a system for tracking movement of a trailer, comprising:
    a network;
    a computer system communicatively coupled to the network, wherein the computer system includes a data storage system used to store information identifying the trailer;
    a first terminal management system associated with the first railway terminal, wherein the first terminal management system is communicatively coupled to the network and communicates through the network to the computer system; and
    a second terminal management system associated with the second railway terminal, wherein the second terminal management system is communicatively coupled to the network and communicates through the network to the computer system;
    wherein trailers enter and exit each railway terminal; and
    wherein each terminal management system tracks arrivals and departures of the trailers from each railway terminal and modifies the information stored in the data storage system as a function of said arrivals and departures.

12. The trailer transport system of claim 11, wherein the terminal management system comprises an access restriction system which restricts access to physical locations within the railway terminal.

13. The trailer transport system of claim 12, wherein the access restriction system comprises an access controller coupled to an access server, wherein the access server is coupled to the network.

14. In a trailer transport system having a computer system and a plurality of railway terminals, including a first and a second railway terminal, wherein each railway terminal is configured to receive trains having a plurality of rail cars and to receive trailers to be loaded on the rail cars, a system for tracking movement of a trailer, comprising:
    a network;
    a computer system communicatively coupled to the network, wherein the computer system includes a data storage system used to store information identifying the trailer;
    a first access restriction system associated with the first railway terminal, wherein the first access restriction system is communicatively coupled to the network and communicates through the network to the computer system; and
    a second access restriction system associated with the second railway terminal, wherein the second access restriction system is communicatively coupled to the network and communicates through the network to the computer system;
    wherein trailers enter and exit each railway terminal; and
    wherein each access restriction system tracks arrivals and departures of the trailers from the railway terminal and modifies the information stored in the data storage system as a function of said arrivals and departures.

15. The trailer transport system of claim 14, wherein the access restriction system comprises an access controller coupled to an access server, wherein the access server is coupled to the network.

16. The trailer transport system of claim 14, wherein the computer system includes a web server connected through a firewall to the network, wherein the web server is used by trucking companies to reserve a slot on a selected train.

17. The trailer transport system of claim 14, wherein the computer system includes a web server connected through a firewall to the network, wherein the web server is used by trucking companies to enter trailer information to be stored to the data storage system.

18. The trailer transport system of claim 14, wherein the computer system comprises a main frame and an application server, wherein the mainframe and the application server are communicatively coupled to the network.

19. The trailer transport system of claim 14, wherein the access restriction system comprises a hand held computer unit wirelessly coupled to the network.

20. In a trailer transport system having a computer system and a plurality of railway terminals, including a first and a second railway terminal, wherein each railway terminal is configured to receive trains having a plurality of rail cars and to receive trailers to be loaded and transported on the rail cars and wherein the computer system includes a data storage system used to store information identifying the trailers being transported, a terminal management system, comprising:
 a network interface;
 an access restriction system which restricts access to physical locations within the railway terminal;
  a terminal management computer communicatively coupled to the network interface and to the access restriction system, wherein the terminal management computer includes:
 means for transferring information about trailers being transported from the railway terminals through the network interface to the computer system; and
 means for receiving information about trailers being transported from the railway terminals from the computer system through the network interface.

21. The trailer transport system of claim 20, wherein the access restriction system comprises a hand held computer unit wirelessly coupled to the network.

22. The system according to claim 20, wherein the access restriction system includes a gate and a gate controller, wherein the gate controller operates in conjunction with the computer system to restrict access to its respective railway terminal.

23. A trailer transport system for tracking trains transporting rail cars between railway terminals, wherein each rail car transports a trailer, the system comprising:

a computer system having a trailer tracking program, wherein the trailer tracking program receives information regarding a trailer to be transported and stores the information in a record; and
 a terminal management system associated with each railway terminal. wherein each terminal management system is communicatively connected to the computer system, wherein the terminal management system associated with a particular railway terminal pulls up the record corresponding to the trailer to be transported when the trailer arrives at that railway terminal and modifies the record to reflect the trailer's transportation status.

24. The system according to claim 23, wherein the computer system includes a reservation system for reserving a slot on a selected train, wherein the reservation system operates in conjunction with the trailer tracking program to ensure that a trailer to be transported is placed on the selected train.

25. The system according to claim 24, wherein the terminal management system includes a trailer tracking system connected to the computer system over a network.

26. The system according to claim 25, wherein the trailer tracking system includes a terminal interface coupled to the network.

27. The system according to claim 25, wherein the trailer tracking system includes a terminal interface coupled to the network and a handheld computer unit wirelessly coupled to the terminal interface.

28. The system according to claim 25, wherein the terminal management system includes a trailer tracking device, wherein the trailer tracking device is a handheld computer connected to the computer system over a wireless communications channel.

29. The system according to claim 25, wherein the terminal management system includes an access restriction system which restricts access to physical locations within the railway terminal.

30. The system according to claim 29, wherein the access restriction system includes a gate and a gate controller, wherein the gate controller operates in conjunction with the computer system to restrict access to physical locations within the railway terminal.

* * * * *

UNITED STATES PATENT AND TRADEMARK OFFICE
CERTIFICATE OF CORRECTION

| | | |
|---|---|---|
| PATENT NO. | : 8,612,287 B2 | Page 1 of 1 |
| APPLICATION NO. | : 12/822134 | |
| DATED | : December 17, 2013 | |
| INVENTOR(S) | : Miller et al. | |

It is certified that error appears in the above-identified patent and that said Letters Patent is hereby corrected as shown below:

In the Claims

Column 22, line 6, in claim 23, delete "terminal." and insert --terminal,--, therefor Column 22, line 28, in claim 28, delete "25," and insert --23,--, therefor Column 22, line 33, in claim 29, delete "25," and insert --23,--, therefor Signed and Sealed this
Twenty-fourth Day of June, 2014

Michelle K. Lee
*Deputy Director of the United States Patent and Trademark Office*